(12) United States Patent
Willis et al.

(10) Patent No.: US 10,386,516 B2
(45) Date of Patent: Aug. 20, 2019

(54) TIME-LAPSE 4D SCATTERING FOR IMAGING HYDRAULICALLY INDUCED FRACTURES

(71) Applicant: CONOCOPHILLIPS COMPANY, Houston, TX (US)

(72) Inventors: Mark Elliott Willis, Katy, TX (US); Baishali Roy, Katy, TX (US); Michael Paul Davidson, Conroe, TX (US); Ali Can Tura, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 686 days.

(21) Appl. No.: 14/277,314

(22) Filed: May 14, 2014

(65) Prior Publication Data
US 2014/0343859 A1    Nov. 20, 2014

Related U.S. Application Data

(60) Provisional application No. 61/823,472, filed on May 15, 2013.

(51) Int. Cl.
*G01V 1/30* (2006.01)
*E21B 43/26* (2006.01)

(52) U.S. Cl.
CPC .............. *G01V 1/308* (2013.01); *G01V 1/306* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 3,096,846 A | | 7/1963 | Savit et al. |
| 5,010,527 A | * | 4/1991 | Mahrer .................... E21B 43/26 166/254.2 |
| 6,055,482 A | * | 4/2000 | Sudhakar ................ G01V 1/303 702/16 |
| 6,438,069 B1 | | 8/2002 | Ross et al. |
| 2004/0109387 A1 | * | 6/2004 | Jenner .................... G01V 1/303 367/14 |
| 2011/0182142 A1 | * | 7/2011 | Liu .......................... G01V 1/30 367/47 |
| 2011/0272147 A1 | * | 11/2011 | Beasley .................. E21B 43/26 166/250.1 |
| 2011/0295510 A1 | | 12/2011 | Gulati |
| 2013/0033961 A1 | * | 2/2013 | Burnstad ................ G01V 1/308 367/47 |

OTHER PUBLICATIONS

Willis et al., "Fracture Quality from Integrating Time-Lapse VSP and Microseismic Data" 2007 Industry Consortia Annual Report, MIT Earth Resources Laboratory, 2007.*

(Continued)

*Primary Examiner* — John C Kuan
(74) *Attorney, Agent, or Firm* — ConocoPhillips Company

(57) ABSTRACT

Tools and methods for monitoring a subterranean formation is provided. Methods for monitoring include: creating a time-lapse azimuth stack between an azimuth stack on a first seismic survey and an azimuth stack on a second seismic survey; identifying a lowest root mean square energy and a highest root mean square energy for each time-lapse azimuth stack; and recording an azimuth with largest overall root mean square energy.

14 Claims, 43 Drawing Sheets

(56) References Cited

OTHER PUBLICATIONS

Willis et al., "Spatial orientation and distribution of reservoir fractures from scattered seismic energy" Geophysics, vol. 71, No. 5, 2006.*

International Search Report, PCT/US2014/038036, dated Oct. 14, 2014.

Willis, Mark E., et al—"Fracture Quality From Integrating Time-Lapse VSP and Microseismic Data", 2007, Industry Consortia Annual Report, MIT Earth Resources Laboratory, pp. 1-16; 16 pgs.

Peterson, R.E., et al—"Fracture Diagnostics Research at the GRI/DOE Multi-Site Project: Overview of the Concept and Results", 1996, SPE 36449, Society of Petroleum Engineers, pp. 315-325; 11 pgs.

Grechka, Vladimir, et al—"Feasibiity of seismic characterization of multiple fracture sets", 2003, Geophysics, vol. 68, Issue No. 4, pp. 1399-1407; 9 pgs.

Grechka, Vladimir, et al—"Predicting permeability and gas production of hydraulically fractured tight sands from microseismic data", 2010, Geophysics, vol. 75, Issue No. 1, pp. B1-B10; 10 pgs.

Warpinski, N.R., et al—"Microseismic Mapping of Hydraulic Fractures Using Multi-Level Wireline Receivers", 1995, SPE 30507, Society of Petroleum Engineers, presented at the SPE Annual Technical Conference and Exhibition held in Dallas, Oct. 22-25, 1995, pp. 579-589; 11 pgs.

Warpinski, N.R., et al—"Microseismic Monitoring of the B-Sand Hydraulic-Fracture Experiment at the DOE/GRI Multisite Project", 1996, SPE 36450, Society of Petroleum Engineers, presented at the SPE Annual Technical Conference and Exhibition held in Denver, CO Oct. 6-9, 1996, pp. 327-335; 9 pgs.

Willis, M.E., et al—"Reservoir Fracture Orientation and Density from Reflected and Scattered Seismic Energy", 2004, EAGE 66th Conf and Tech Expo, Abstract only; 1 pg.

Willis, Mark, et al—"Spatial orientation and distribution of reservoir fractures from scattered seismic energy", 2004, SEG International Exposition and 74th Annual Meeting, Denver Colorado Oct. 10-15, 2004; 4 pgs.

Willis, Mark E., et al—"Spatial orientation and distribution of reservoir fractures from scattered seismic energy", 2006, Geophysics, vol. 71, Issue No. 5, pp. 43-51; 9 pgs.

* cited by examiner

TIME-LAPSE 4D SCATTERING FOR IMAGING HYDRAULICALLY INDUCED FRACTURES

CROSS-REFERENCE TO RELATED APPLICATIONS

This application is a non-provisional application which claims benefit under 35 USC § 119(e) to U.S. Provisional Application Ser. No. 61/823,472 filed May 15, 2013, entitled "TIME-LAPSE 4D SCATTERING FOR IMAGING HYDRAULICALLY INDUCED FRACTURES," which is incorporated herein in its entirety.

STATEMENT REGARDING FEDERALLY SPONSORED RESEARCH

None.

FIELD OF THE INVENTION

The present invention relates generally to imaging a subterranean formation. More particularly, but not by way of limitation, embodiments of the present invention include systems and methods for monitoring induced fractures using time-lapse seismic surveys.

BACKGROUND OF THE INVENTION

Seismic surveys image or map a subterranean formation by imparting acoustic energy into the ground and recording reflected energy or "echoes" that return from subsurface rock layers below. Some conventional sources of the acoustic energy include explosions, air guns, vibrators, and typically positioned on or near surfaces of the earth. Each time the acoustic energy source is activated, a seismic signal is generated. The seismic signal travels into the earth, where it is partially reflected, and, upon its return, may be detected at many locations on the surface as a function of travel time. Sensors commonly used to detect returning seismic energy include, but are not limited to, geophones, accelerometers, and hydrophones. The returning seismic energy is recorded as a continuous signal containing information related to displacement, velocity, acceleration, and/or other recorded variation as a function of time. Multiple combinations of acoustic energy source and sensor can be subsequently combined to create a near continuous image of the subsurface that lies beneath a survey area. One or more sets of seismic signals may be assembled in a final seismic survey.

Time-lapse methods has been used to improve reservoir management around the world in many hydrocarbon producing basins. Time-lapse seismic survey involves acquiring, processing, and interpreting repeated seismic surveys over a producing hydrocarbon reservoir. A four-dimensional (4D) seismic dataset may include a set of three-dimensional (3D) seismic data taken at different time points. Changes occurring in the reservoir can be determined by comparing repeated datasets (i.e., datasets collected over the same reservoir at different time points). Thus, time-lapse methods can monitor production-related changes in the reservoir.

In order for time-lapse seismic survey to be effective, changes in the reservoir properties must cause a detectable change in seismic signal. Saturation and/or pressure changes of a hydrocarbon producing reservoir can create a difference in elastic properties (e.g., velocities and density) that may be large enough to be detected by surface seismic surveys. Strength of the signal will depend on a number of factors including, but not limited to, magnitude of change in the reservoir properties and sensitivity of the elastic properties to these changes.

Hydraulic fracturing is an economically important technology applied to oil and gas reservoirs to increase oil and gas production. During hydraulic fracturing, highly pressurized fluids are injected into reservoir rock. The pressurized fluids overcome the breaking strength of the rock and induce fractures that act as pathways by which oil and natural gas can migrate to the borehole and be brought to the surface. Mapping and characterizing these fracture systems may be important in order to more fully realize the economic benefits of hydraulic fracturing. Despite advances in time-lapse seismic methods, fractures created by hydraulic fracturing can still be difficult to detect using time-lapse seismic methods.

BRIEF SUMMARY OF THE DISCLOSURE

The present invention relates generally to imaging a subterranean formation. More particularly, but not by way of limitation, embodiments of the present invention include systems and methods for monitoring induced fractures using time-lapse seismic surveys.

One example of a method for monitoring a subterranean formation comprises: (a) creating a time-lapse azimuth stack between an azimuth stack on a first seismic survey and an azimuth stack on a second seismic survey; (b) identifying a lowest root mean square energy and a highest root mean square energy for each time-lapse azimuth stack; and (c) recording an azimuth with largest overall root mean square energy.

Another example of a method for monitoring hydraulic fracturing treatment of a subterranean formation comprises: (a) performing an azimuth stack on a base survey of the subterranean formation before hydraulic fracturing treatment; (b) performing an azimuth stack on a monitor survey of the subterranean formation after hydraulic fracturing treatment; (c) creating a time-lapse azimuth stack between the azimuth stack on the base survey and the monitor stack on the second survey; (d) identifying a lowest root mean square energy and a highest root mean square energy for each time-lapse azimuth stack; and (e) recording an azimuth with largest overall root mean square energy.

Yet another example of method for monitoring hydraulic fracturing treatment of a subterranean formation comprises: (a) sending a seismic signal in the subterranean formation; (b) performing an azimuth stack on a base survey of the subterranean formation before hydraulic fracturing treatment; (c) performing an azimuth stack on a monitor survey of the subterranean formation after hydraulic fracturing treatment; (d) creating a time-lapse azimuth stack between the azimuth stack on the base survey and the monitor stack on the second survey; (e) identifying a lowest root mean square energy and a highest root mean square energy for each time-lapse azimuth stack; and (f) recording an azimuth with largest overall root mean square energy.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
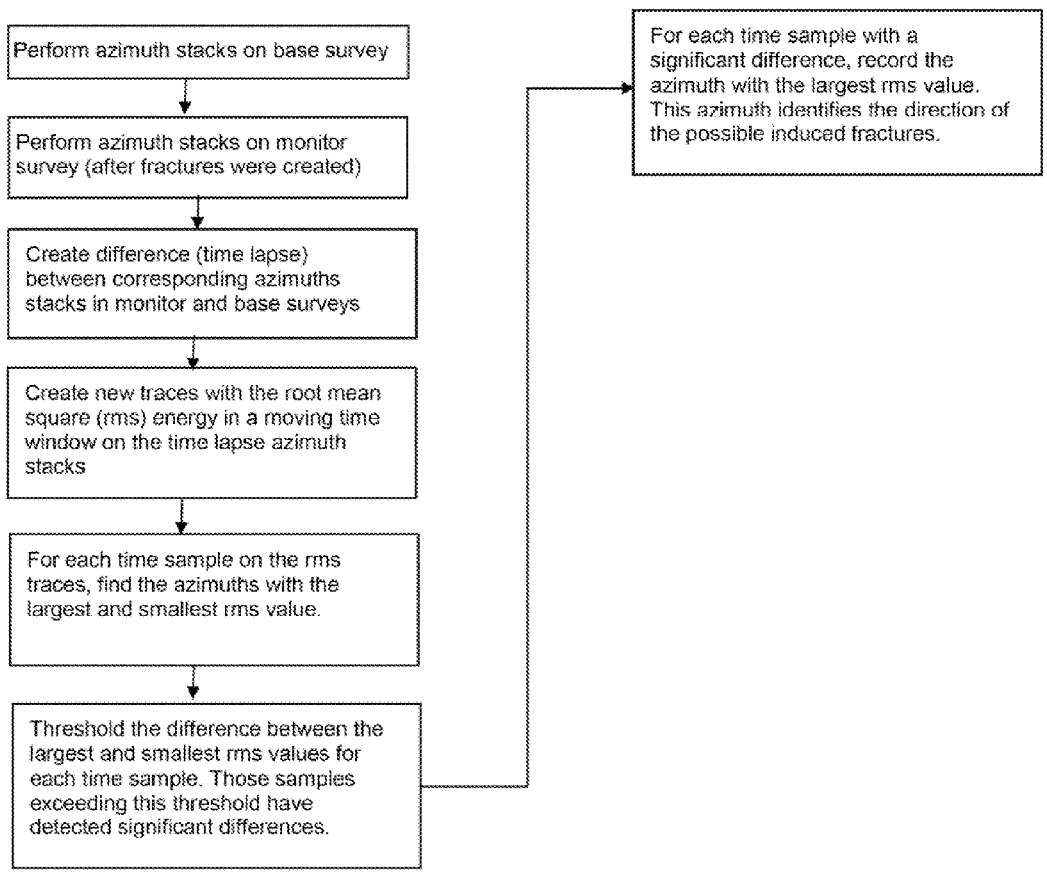
FIG. 1 shows a flowchart illustrating steps involved during a 4D scattering analysis according to one or more embodiments.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention provides tools and methods for imaging or mapping a subterranean formation. In some embodiments, the present invention provides monitoring of the subterranean formation in real-time, semi real-time, and/or post-treatment. While at least one reference is made herein to induced fractures that result from a hydraulic fracturing treatment, this is not intended to be limiting. Moreover, applicability of the methods described herein is not limited to surface seismic measurements. The present invention may be extended to other acquisition geometries/methods such as, for example, borehole seismic measurements (vertical seismic profile, crosswell) where a scattered wavefield can be measured with a wide azimuth illumination.

As used herein, the term "treatment" may refer to any perturbation and/or change of a subterranean formation including, but not limited to, water injection, production depletion, and the like. In particular, the present invention provides time-lapse seismic methods for detecting changes in scattered wavefields arising from induced fractures during hydraulic fracturing treatment. In one embodiment, the present invention combines one or more aspects of: measuring changes in a subterranean formation using time-lapse analysis, using scattered wavefield (as opposed to reflected wavefield) from fractures as a characteristic indicator, and analyzing azimuthal anisotropy in a transversely isotropic model with horizontal axis of rotational symmetry (HTI model).

Seismic energy sent to subsurface of the earth may return as seismic reflections and/or seismic scattering. If fracture dimensions and spacing are small relative to seismic wavelength, then the resulting seismic reflections from the top and bottom of a fractured reservoir will display amplitude variations with offset and azimuth (AVOA). If fracture dimensions and spacing are close in size to the seismic wavelength, then the fractures will scatter the P- and converted S-wave energy causing a complex, reverberating, seismic signature or coda which is a ringing tail of scattered energy and can vary as a function of orientation of seismic acquisition relative to fracture orientation. Degree of scattering can depend on azimuth between acquisition geometry and fracture strike line. Scattering can also be affected when seismic wavelengths are tuned with respect to fracture density and stiffness. Azimuthal anisotropy is a variation in one or more of local seismic properties on the azimuth of propagation. An HTI model is a relatively simple type of azimuthally anisotropic medium, which can be used to described vertically aligned fractures such as those induced during hydraulic fracturing.

Time-lapse (4D) seismic survey is a known reservoir surveillance tool that analyzes differences between multiple seismic surveys taken over a particular reservoir at different time points. Time-lapse or 4-D seismic surveys use the difference between surface seismic surveys to measure production and reservoir properties at different times during the life of the reservoir. Observed changes in the reservoir's seismic properties can assist in characterization of the reservoir. Differences between the surveys may be attributed to changes in saturation, pressure or may be caused overburden stress due to reservoir compaction. Time-lapse surveys may indicate, for example, presence of barriers to reservoir connectivity, changes in reservoir saturation and pressure, and changes in overburden rock strength. Further descriptions of seismic survey and time-lapse seismic survey methods can be found in U.S. Pat. Nos. 3,096,846, and 6,438,069, the relevant portions of which are herein incorporated by reference.

In order to monitor hydraulic fracturing, surface seismic data is collected at various time points. A base survey may be taken before treating or effecting a change in a reservoir (e.g., before hydraulic fracturing treatment). A monitor survey may be taken at some time after the base survey has been measured (e.g., after hydraulic fracturing treatment). Background reflectivity may be subtracted from seismic energy by subtracting azimuth stacks in the base survey from the corresponding monitor survey stacks. Azimuthal change in the scattered energy can be identified from these time-lapse (monitor survey stacks minus base survey stacks) azimuth stacks. A root mean square (RMS) amplitude of the resulting time-lapse azimuth stack traces may be computed and the azimuth with the largest difference, as a function of time, can reveal orientation of the induced fractures. As used herein, RMS amplitude refers to a post-stack attribute that computes the square root of the sum of squared amplitudes divided by the number of samples within a specified window used. RMS energy is directly related to RMS amplitude and may be computed by taking a sum of squared RMS amplitudes divided by the number of samples within a specified window used.

Regularly spaced, discrete vertical fractures may impart a ringing coda type signature to all seismic energy that is transmitted through or reflected off of the fractures. This signature varies in amplitude and coherence as a function of several parameters including, but not limited to, 1) the difference in angle between the orientation of the fractures and the acquisition direction, 2) the fracture spacing, 3) the wavelength of the illuminating seismic energy, and 4) the compliance, or stiffness, of the fractures. Typically, the coda energy is most coherent when the acquisition direction is parallel to the strike of the fractures. Moreover, the coda energy has its largest amplitude when the seismic wavelengths are tuned to the fracture spacing, and when the fractures have low stiffness.

When induced fractures are developed in preferential directions, azimuth stacks from surface seismic surveys acquired before and after a treatment (e.g., hydraulic fracturing treatment) can show increased changes in selected azimuths. In one embodiment, the scattered wavefield is searched such that azimuthal 4D changes are expected to occur in a time window on the stacked difference trace below a fractured reservoir interval. Fracture orientation information can be determined by extracting a scattering index (i.e., change in seismic wavelet above and below the fractured region) and determining the azimuth with largest scattering index.

FIG. 1 is a flowchart that summarizes steps involved during a time-lapse seismic analysis according to one or more embodiments. In the first two steps, azimuth stacks are performed on the base and monitor surveys. In one or more embodiments, an azimuth stack includes 9 traces at every 20 degrees and overlapping 40 degrees. Third, time-lapse analysis is performed on the surveys by calculating the difference between the azimuth base and monitor stacks to create a time-lapse azimuth stack. Next, new traces with root mean square (RMS) energy in a moving time window on the time-lapse azimuth stacks are created, which allows for computation of RMSe amplitude of time-lapse azimuth stack traces.

Next, for each time sample on the RMS trace, azimuths with the largest and smallest RMS values are identified. The RMS energy in a sliding window along each of the difference traces is used as the basis for comparing the amount of scattered energy for each azimuth. A representative time window is about 100 ms below the reservoir for the analysis. Each common depth point (CDP) may be studied separately, wherein for a particular CDP, the azimuths with the maximum and minimum RMS energy is identified. A significant difference between the maximum and minimum RMS values indicates that there may be a preferred scattering orientation. If this preferred orientation is detected, then the fracture orientation is identified as the direction corresponding to the trace with maximum RMS energy. Sixth, samples are sorted according to their differences between the largest and smallest RMS values. In one embodiment, those samples exceeding a specific threshold (between largest and smallest RMS value) may be marked for further analysis. Last, for each time sample with a threshold difference, the azimuth with the largest RMS value is identified. The azimuth with the largest difference, as a function of time, can reveal the orientation of the fractures.

Example 1

Figure 2:
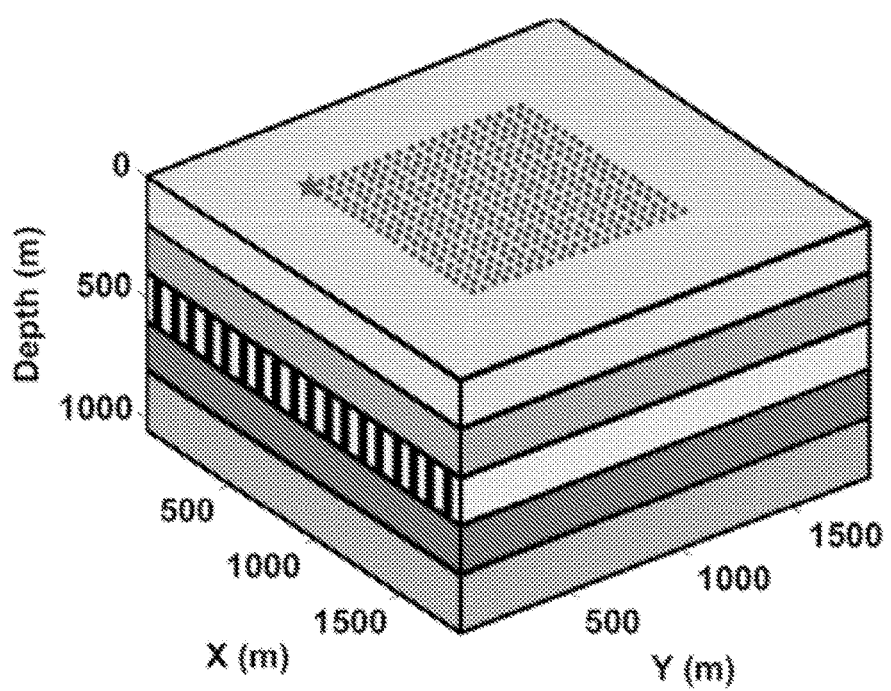
FIG. 2 shows a sample model layout of a reservoir containing vertical fractures.

In this example, a reservoir located in Stocker Field (Barnett Shale, Denton County Tex.) was characterized using a time-lapse analysis method according to one or more embodiments. A 3D seismic survey of the reservoir was shot before and after the hydraulic fracturing. FIG. 2 shows a five layer model containing vertical fractures in the middle layer. Synthetic traces were created using a 3D finite difference modeling algorithm for a shot (star) and receivers (dots). The spacing between the vertical fractures are varied to be 10 m, 25 m, 35 m, 50 m, and 100 m. Azimuth gathers were created for every 10 degrees. Azimuth stacks for zero degrees corresponds to an acquisition direction normal to the fractures while 90 degrees corresponds to an acquisition direction parallel to the fractures.

Figure 3:
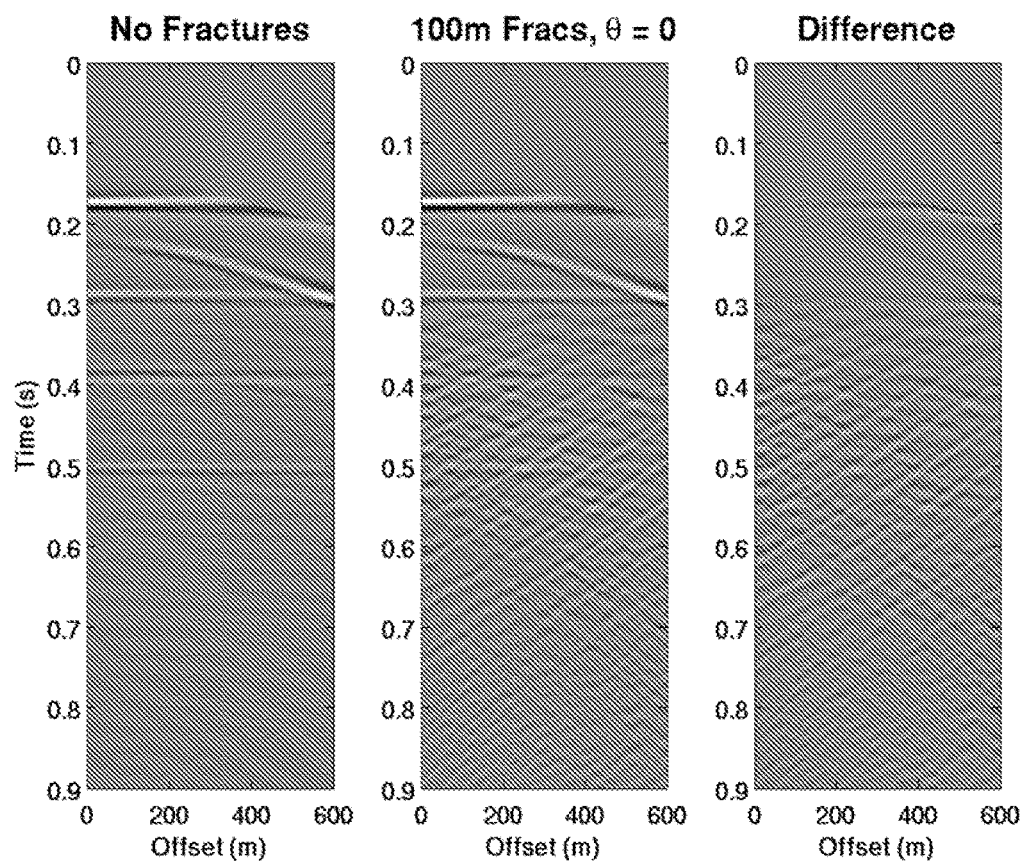
FIGS. 3-13 show NMO shot gathers for 100 m fracture spacing as described in Example 1.
Figure 4:
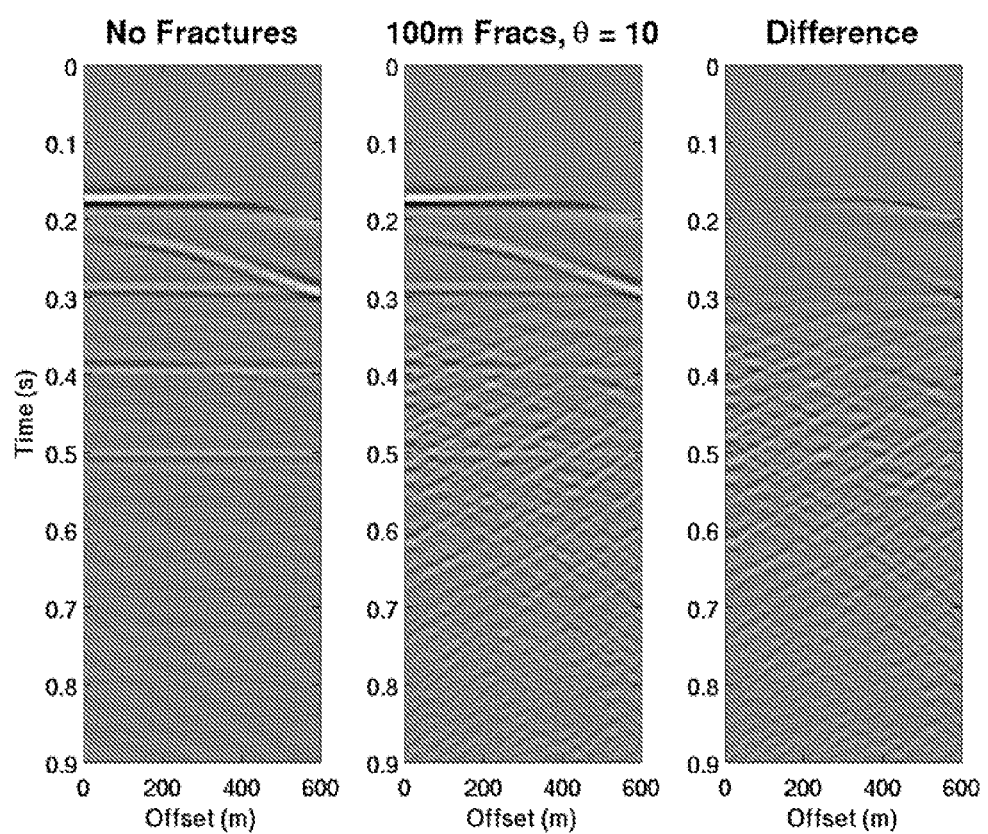
Figure 5:
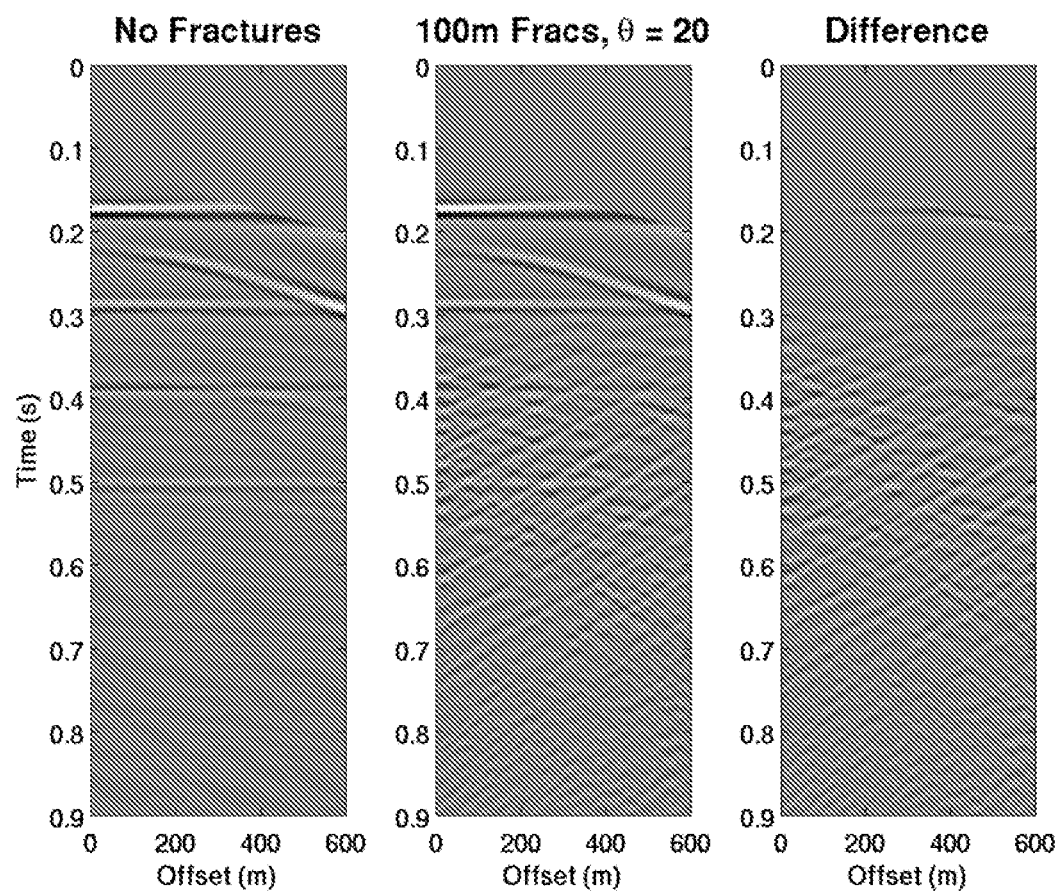
Figure 6:
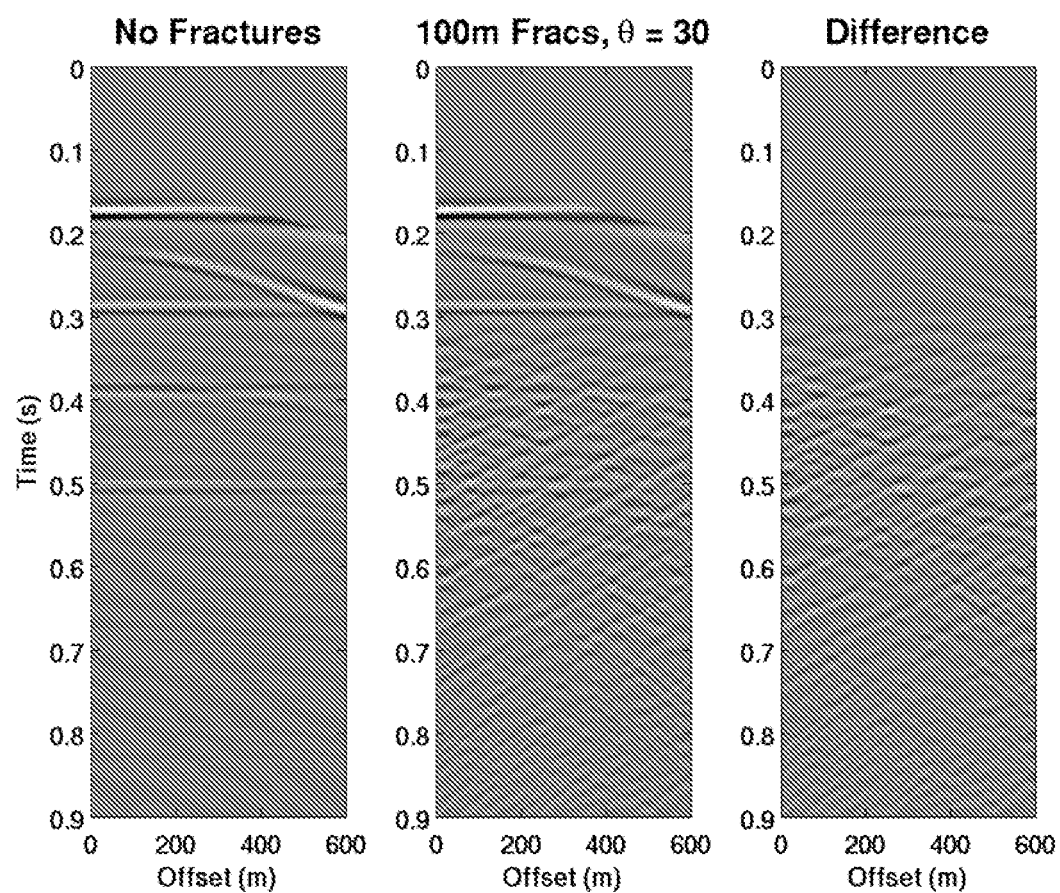
Figure 7:
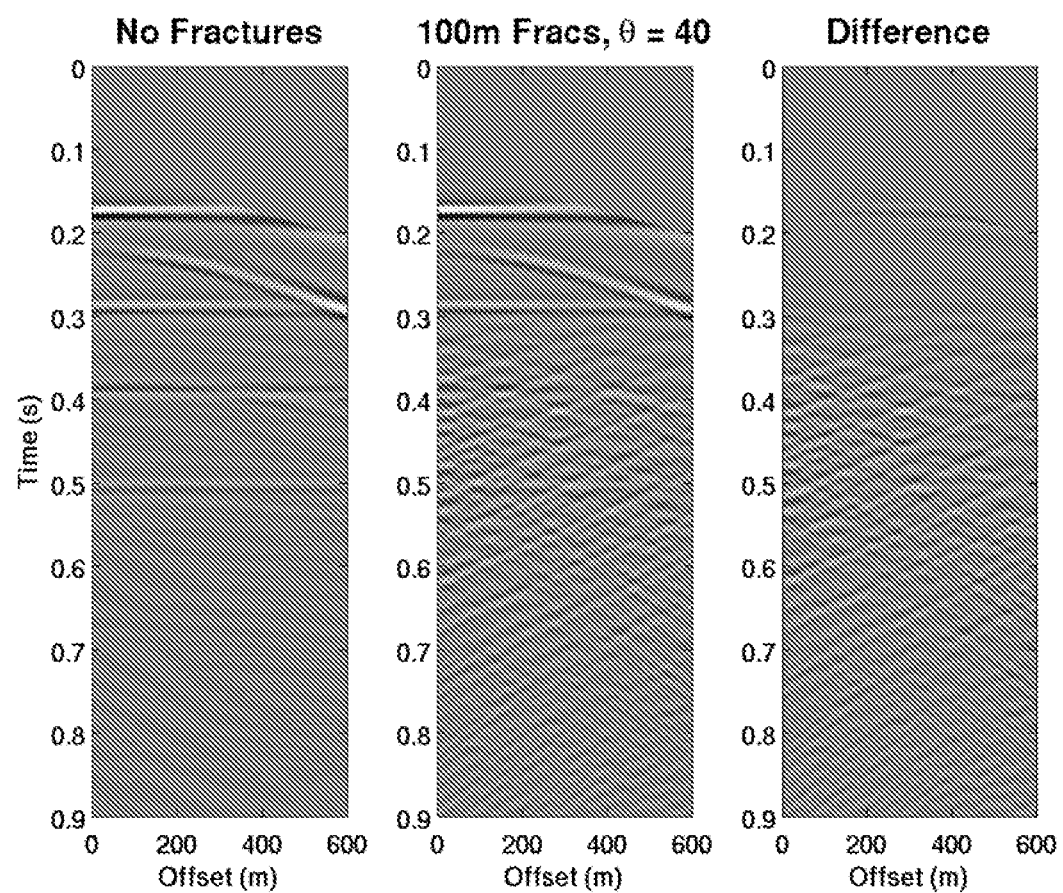
Figure 8:
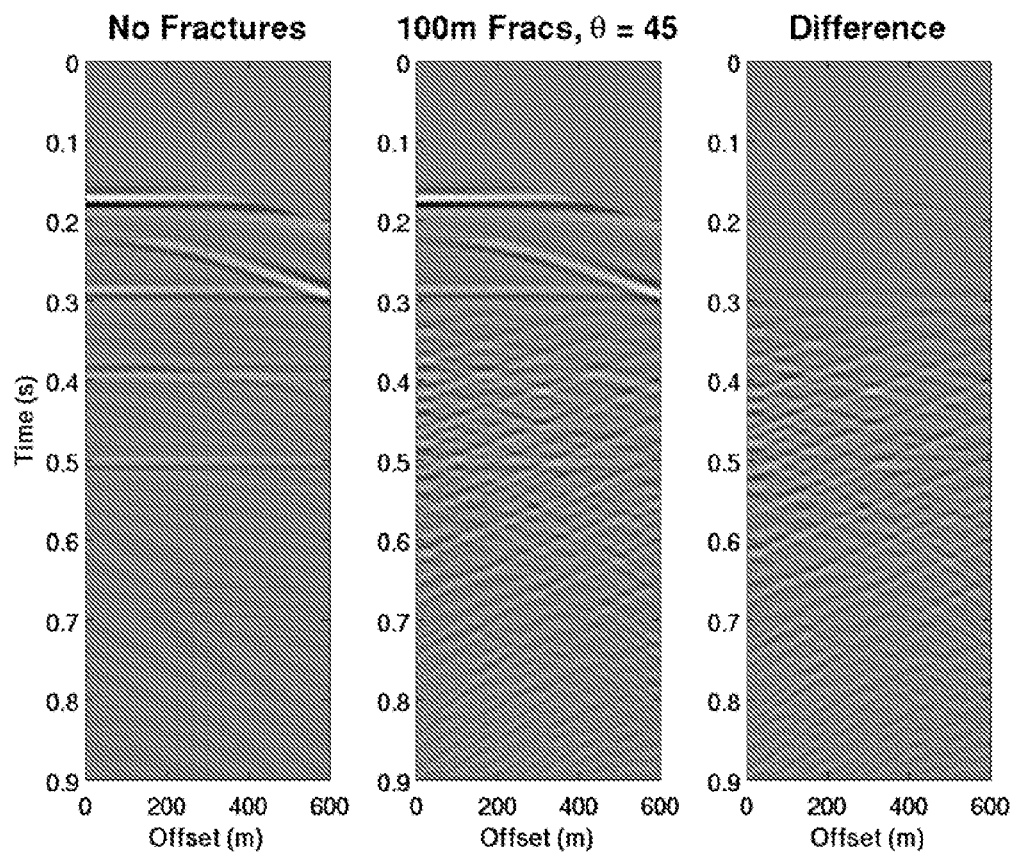
Figure 9:
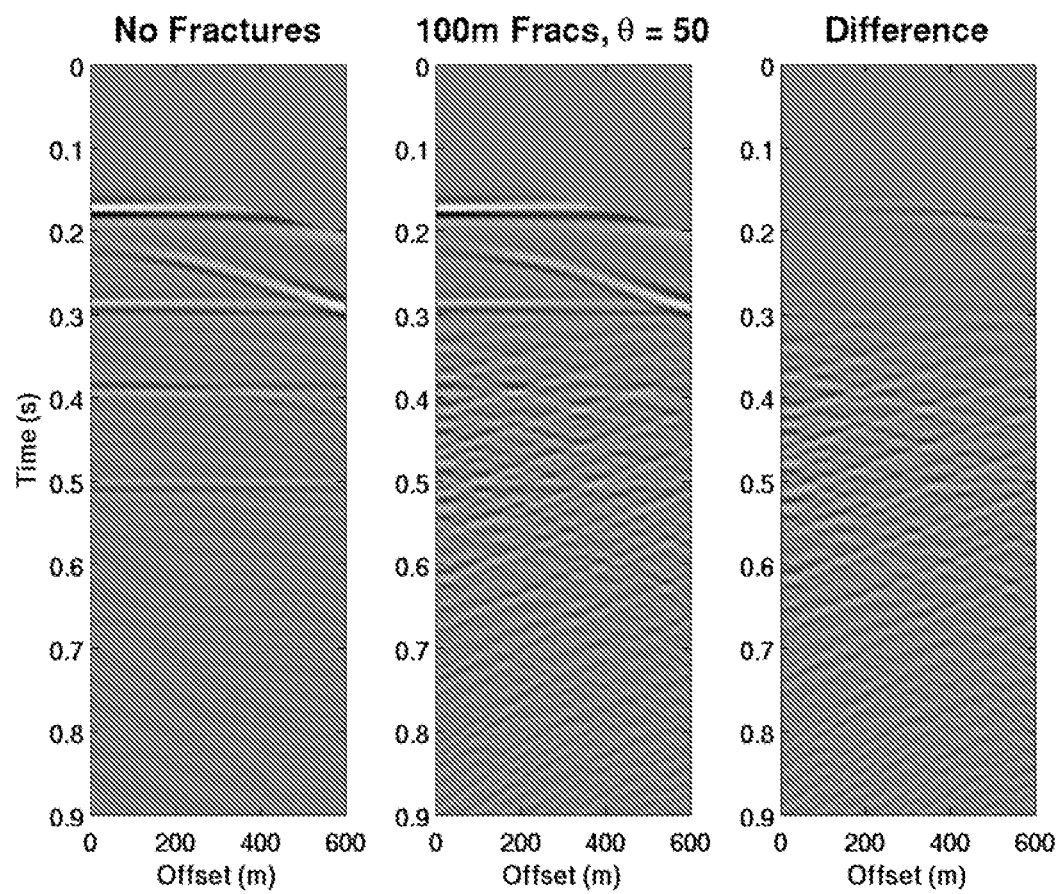
Figure 10:
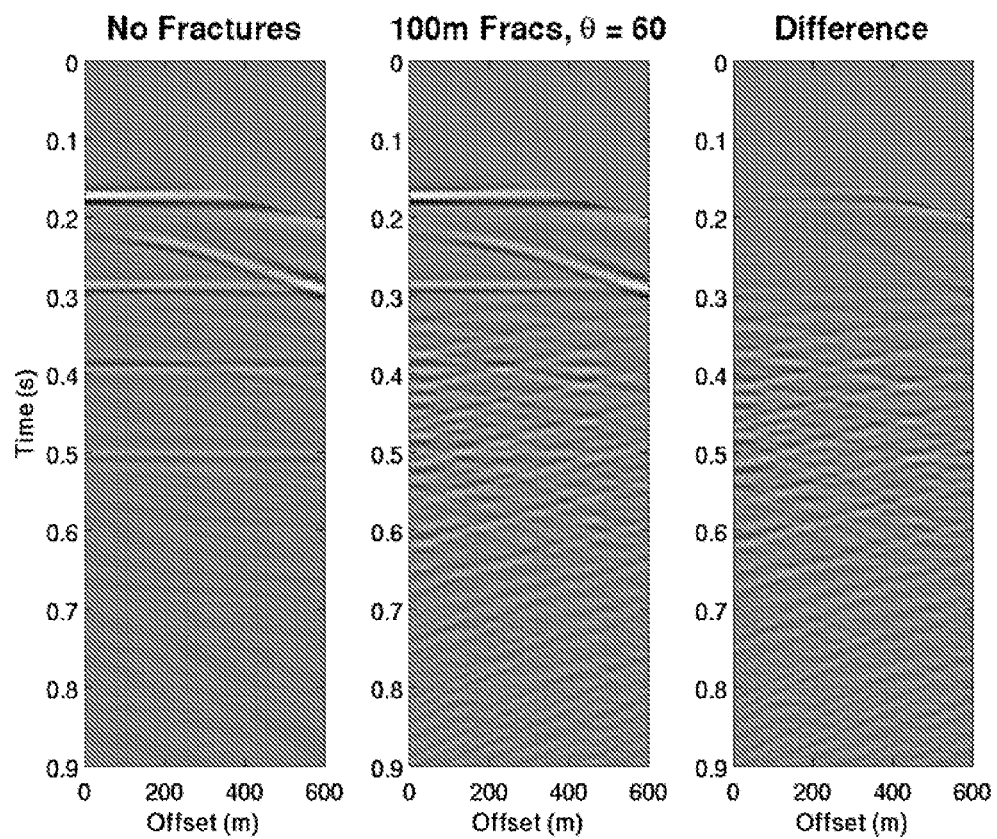
Figure 11:
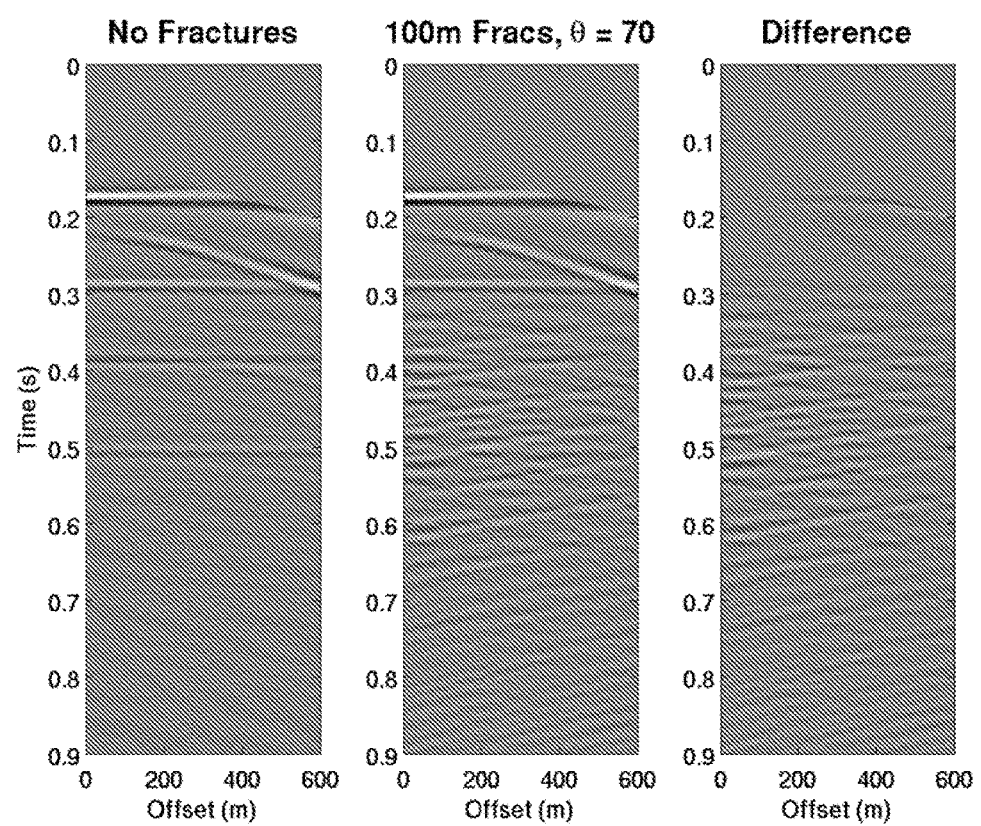
Figure 12:
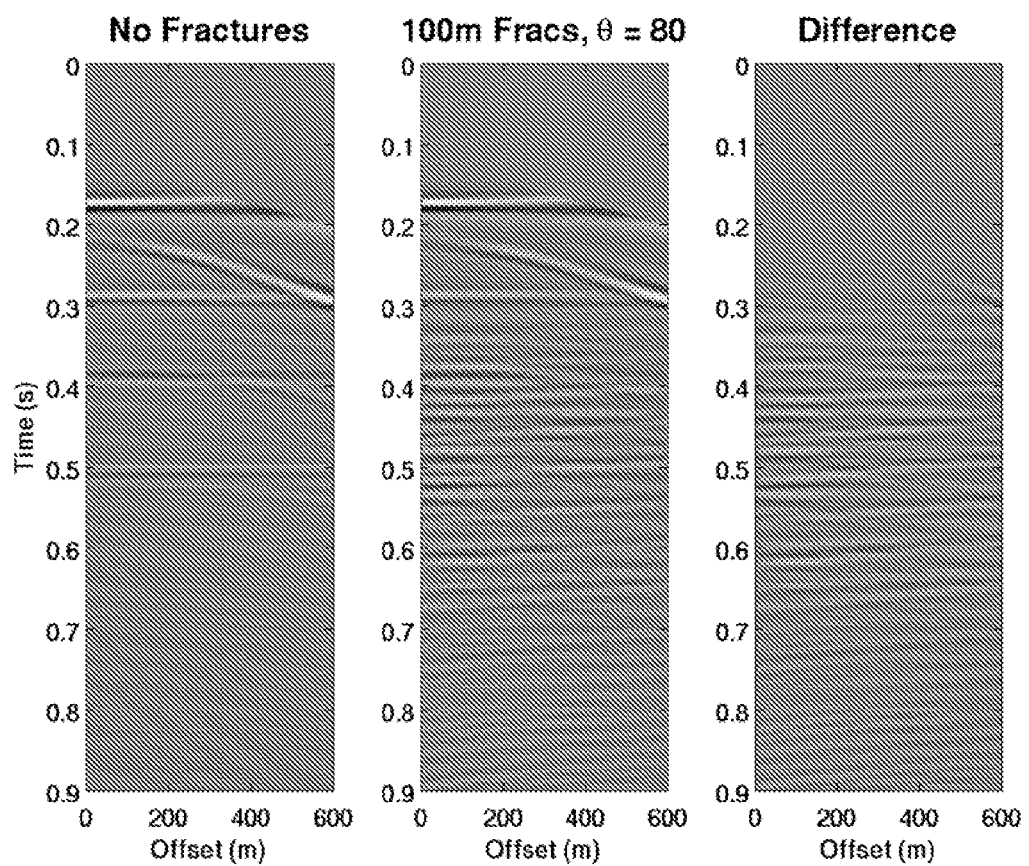
Figure 13:
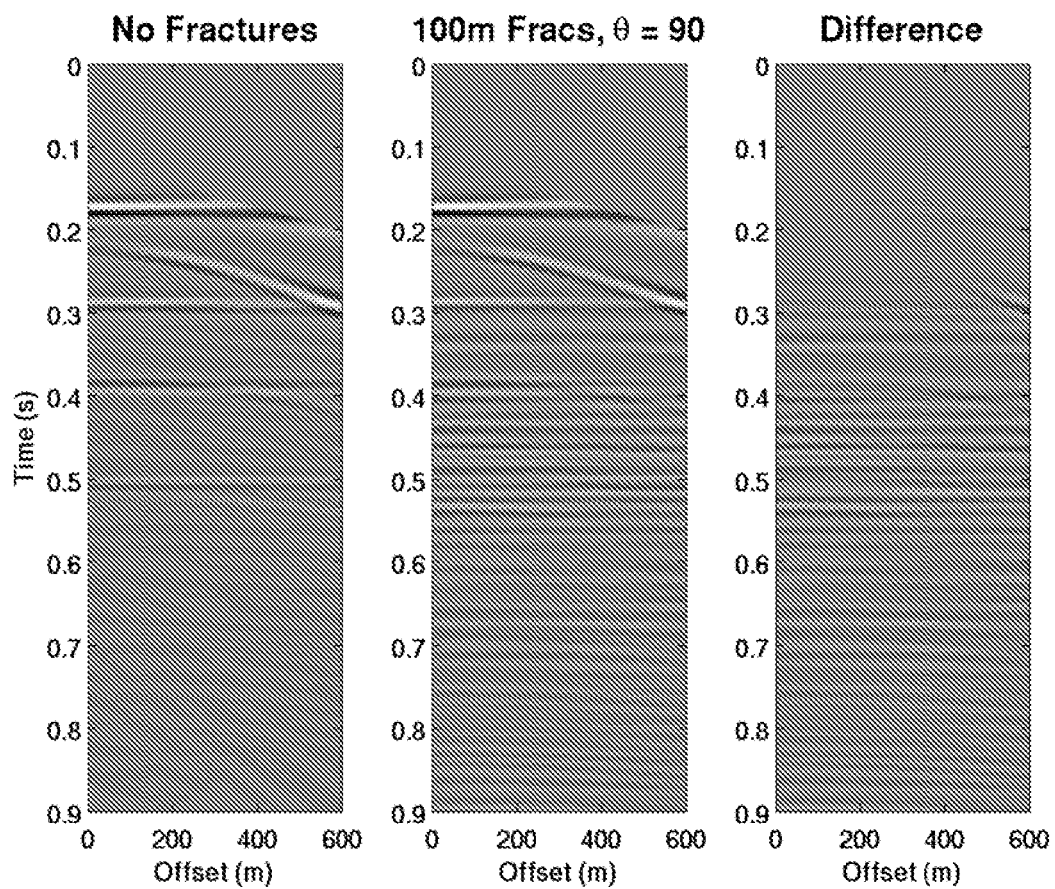
Figure 14:
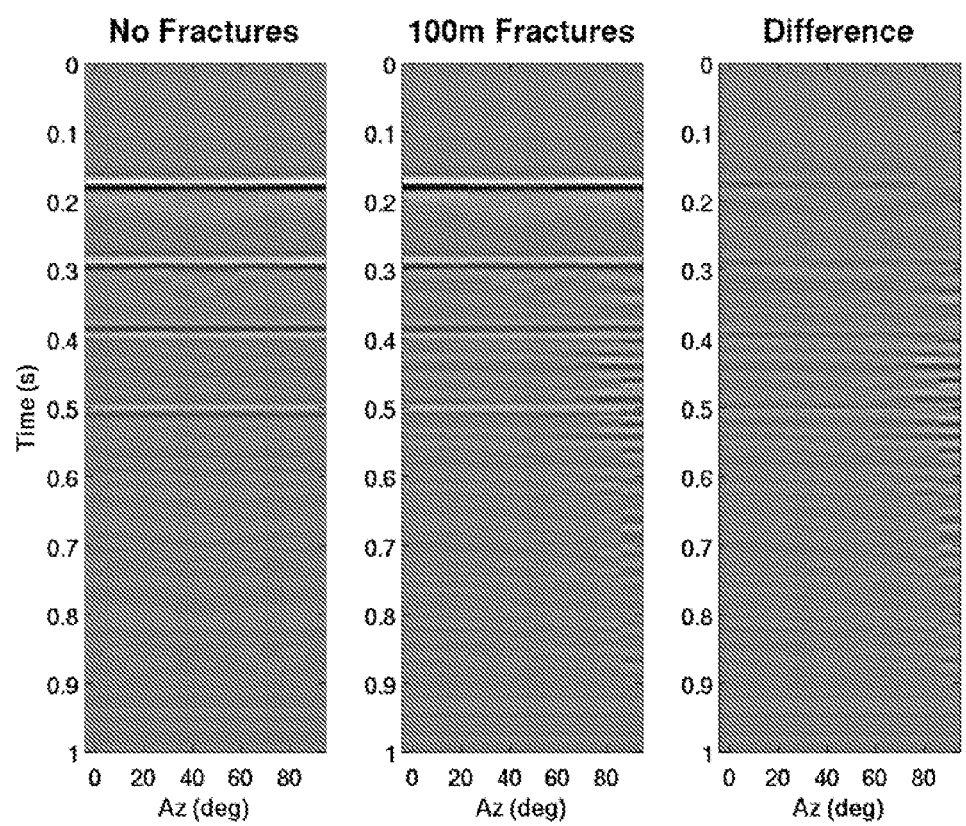
FIG. 14 shows variable density azimuth stacks for 100 m fracture spacing as described in Example 1.
Figure 15:
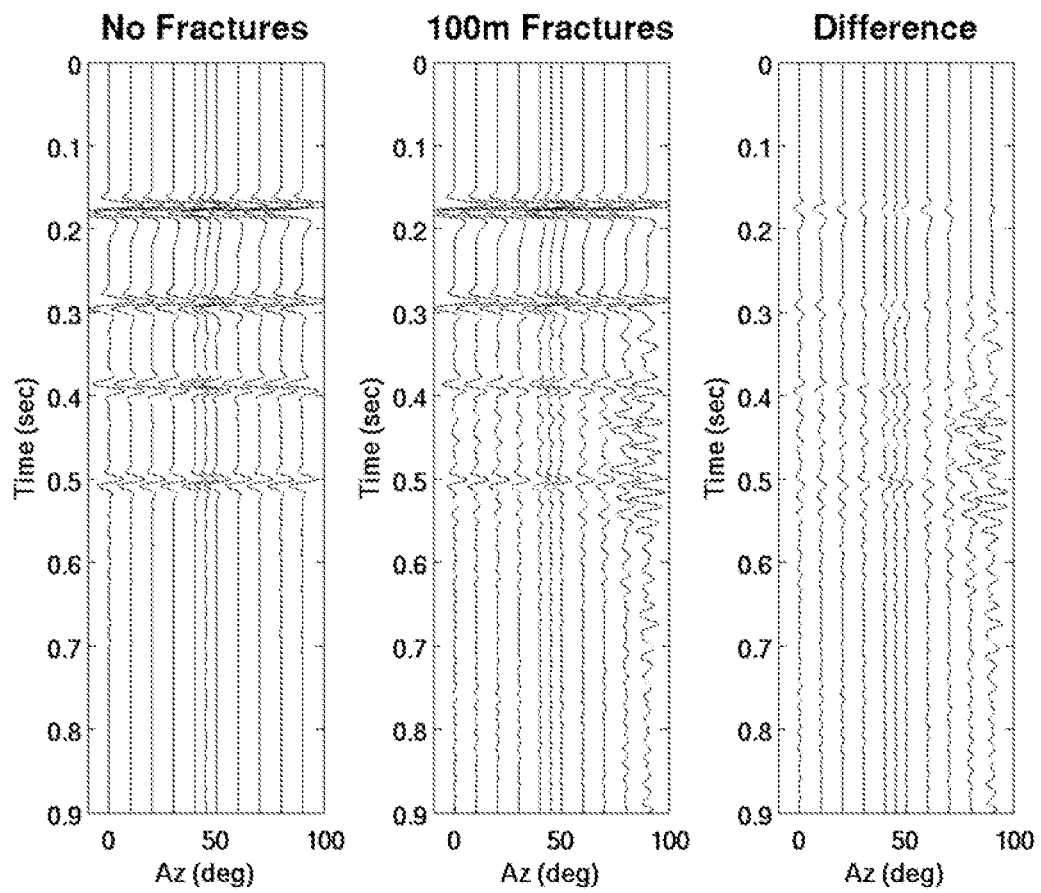
FIG. 15 shows wiggle trace azimuth stacks for 100 m fracture spacing as described in Example 1.
Figure 16:
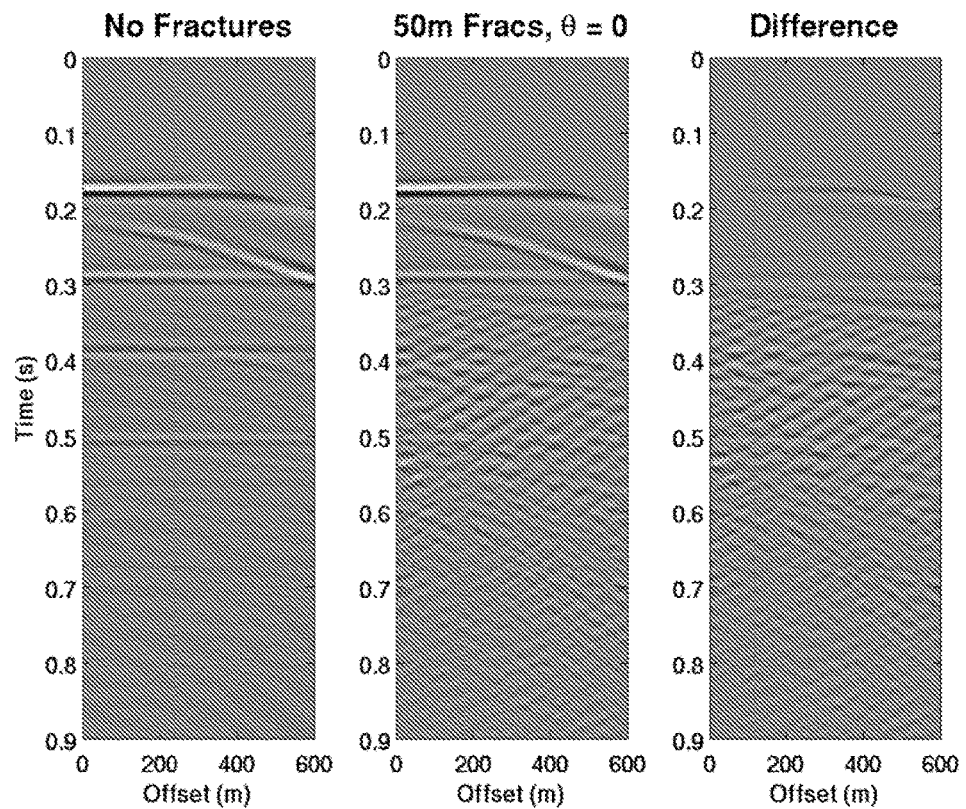
FIGS. 16-26 show NMO shot gathers for 50 m fracture spacing as described in Example 1.
Figure 17:
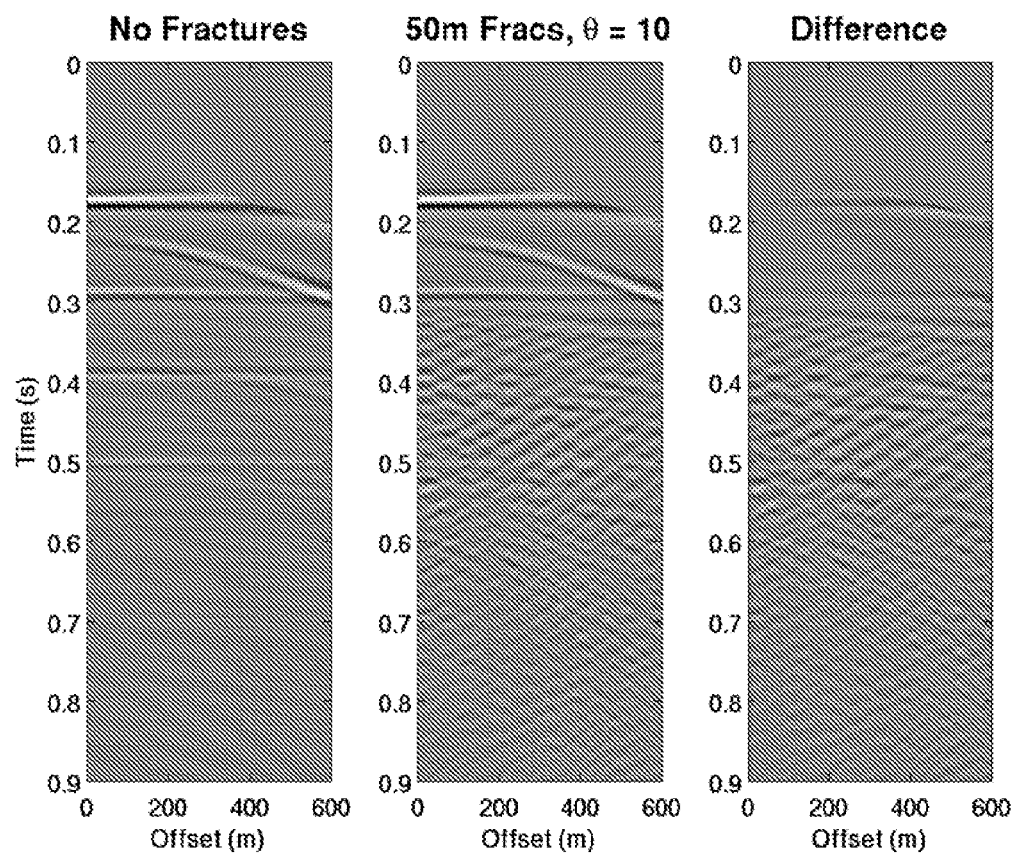
Figure 18:
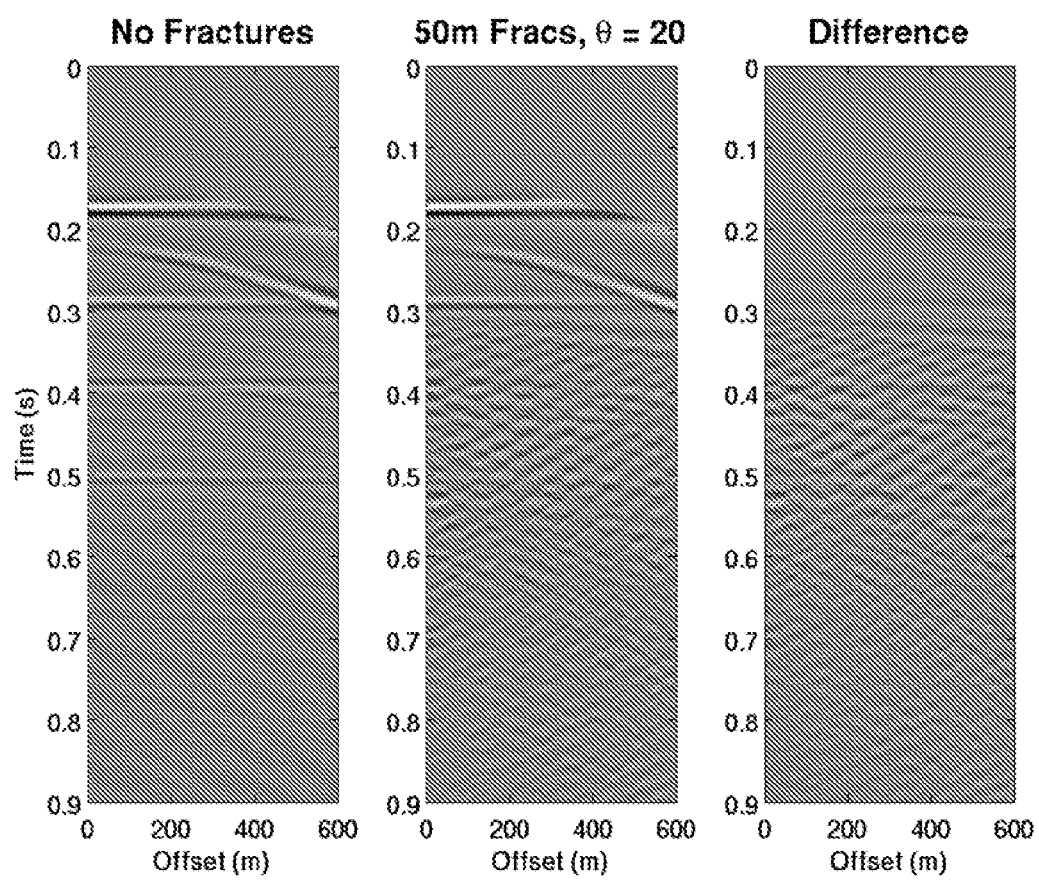
Figure 19:
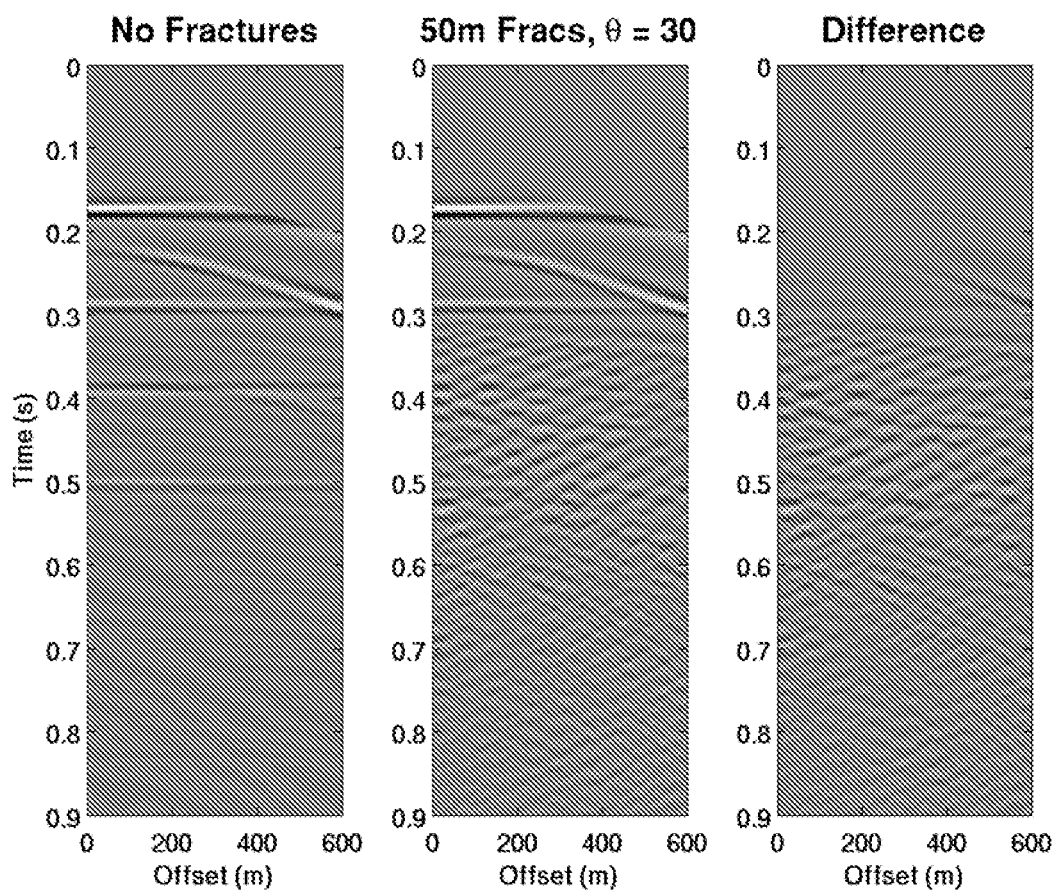
Figure 20:
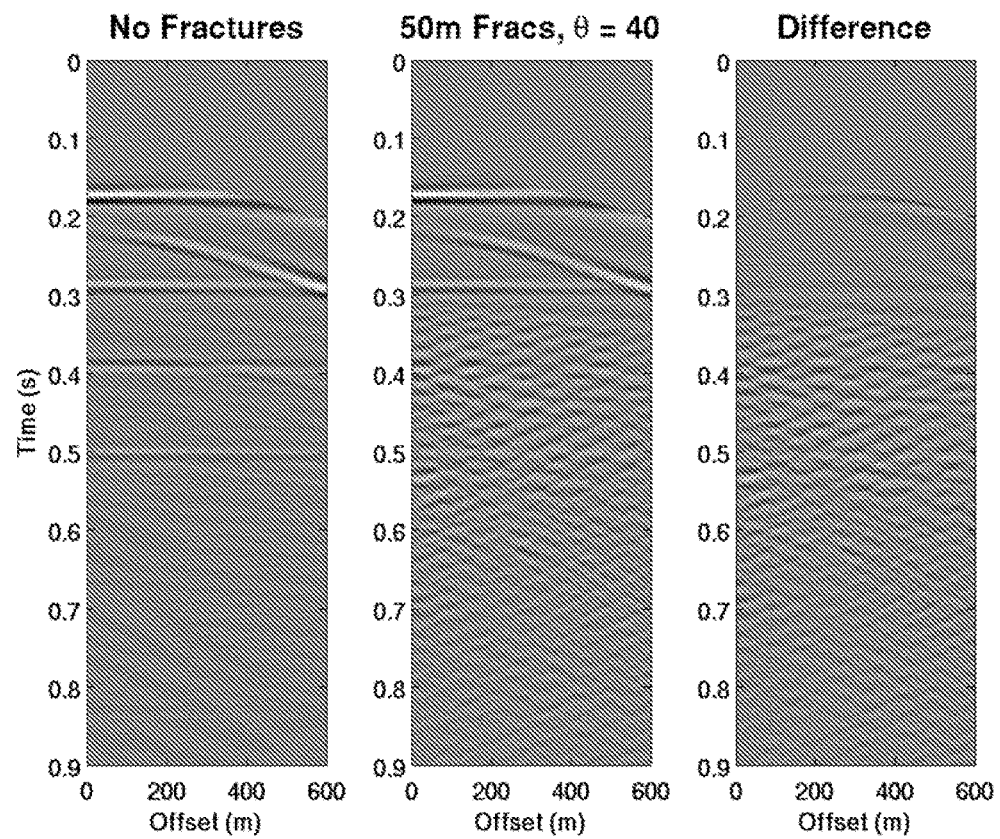
Figure 21:
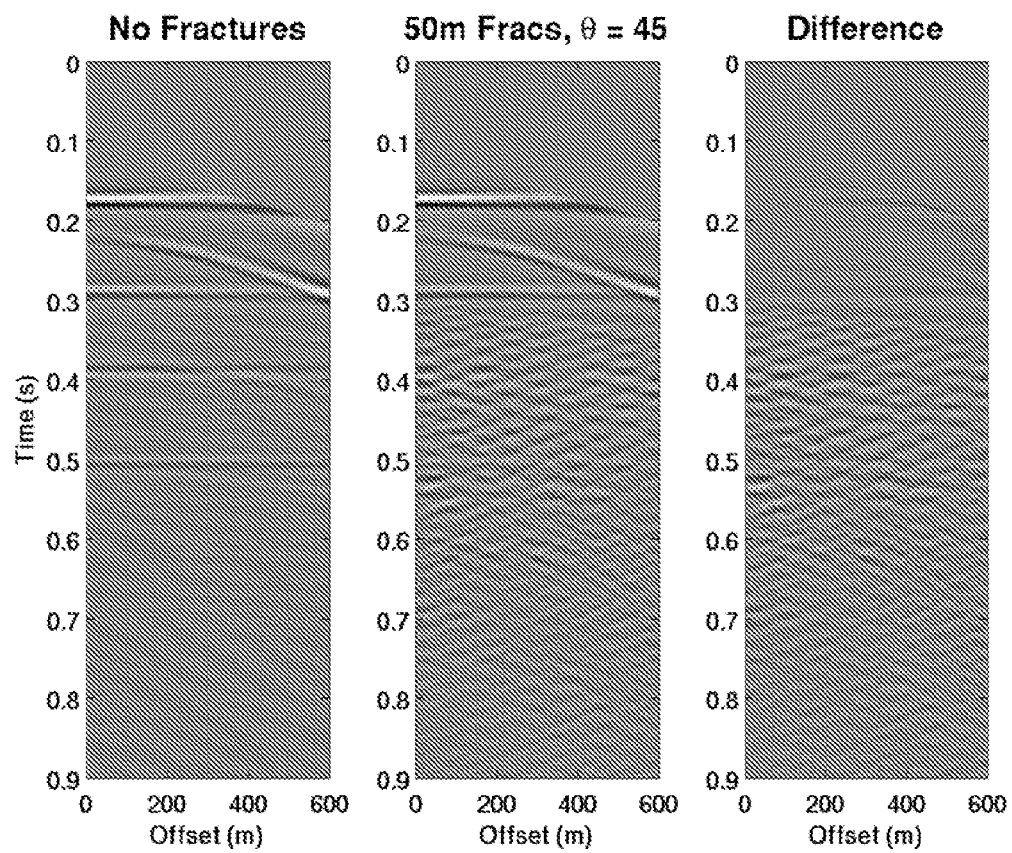
Figure 22:
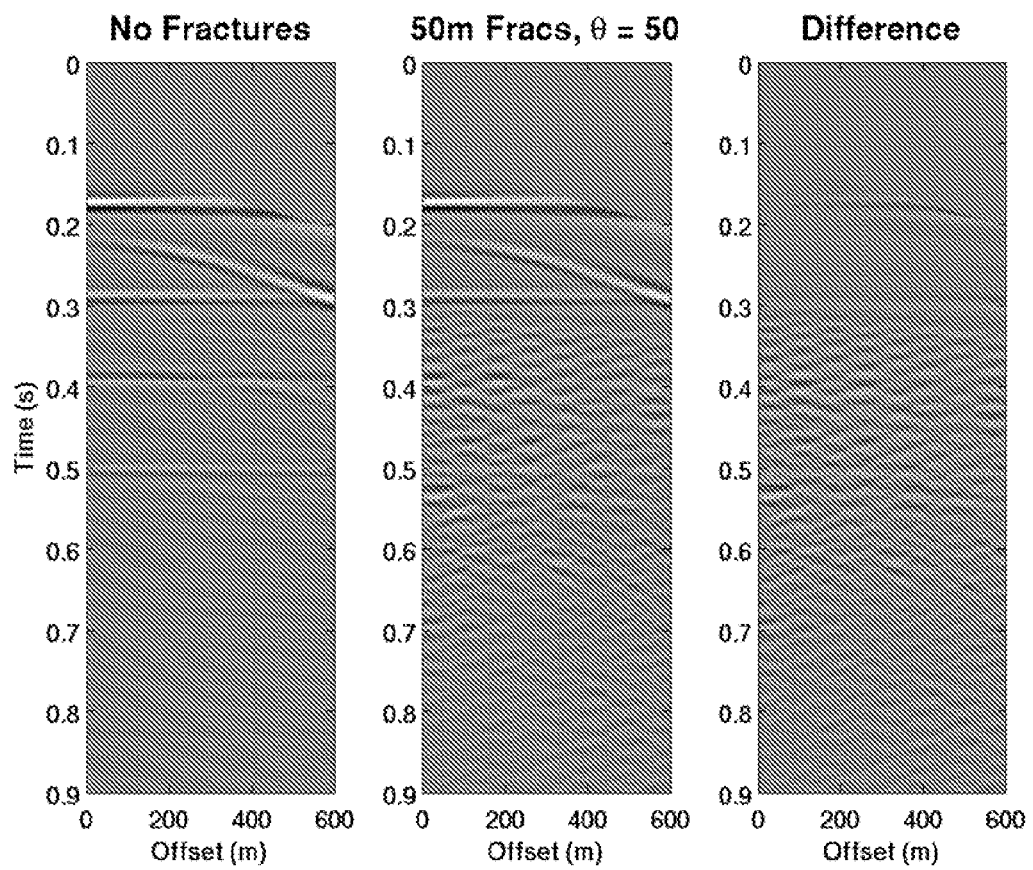
Figure 23:
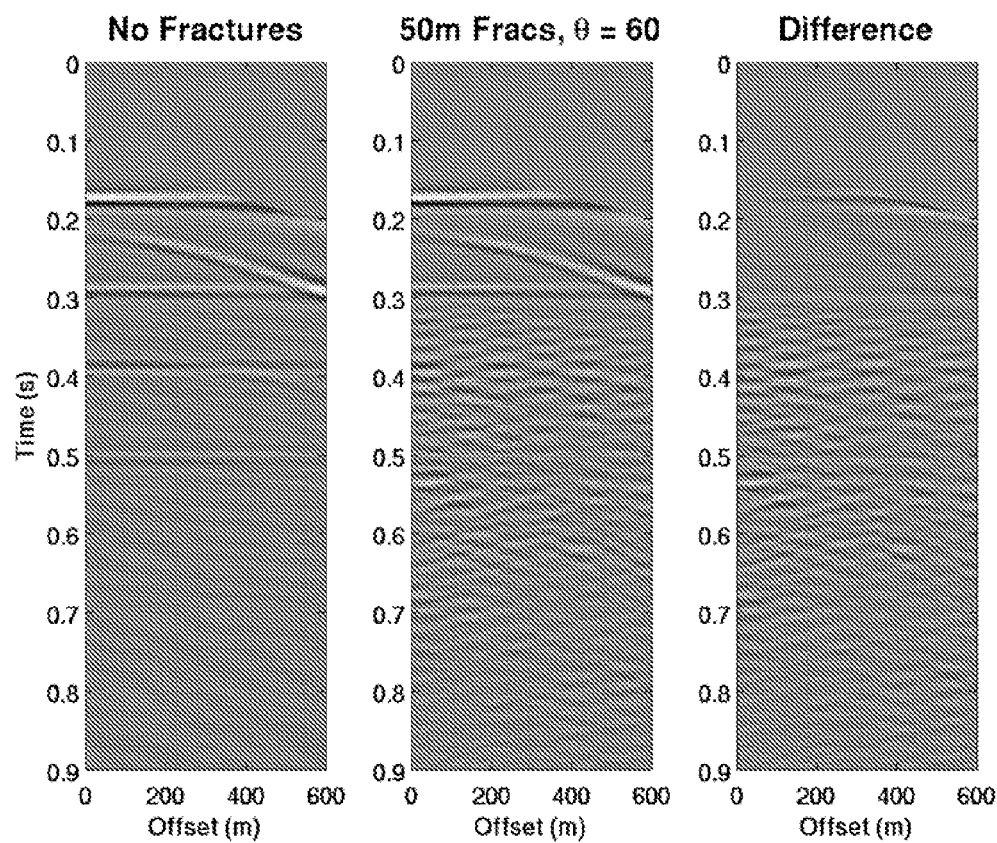
Figure 24:
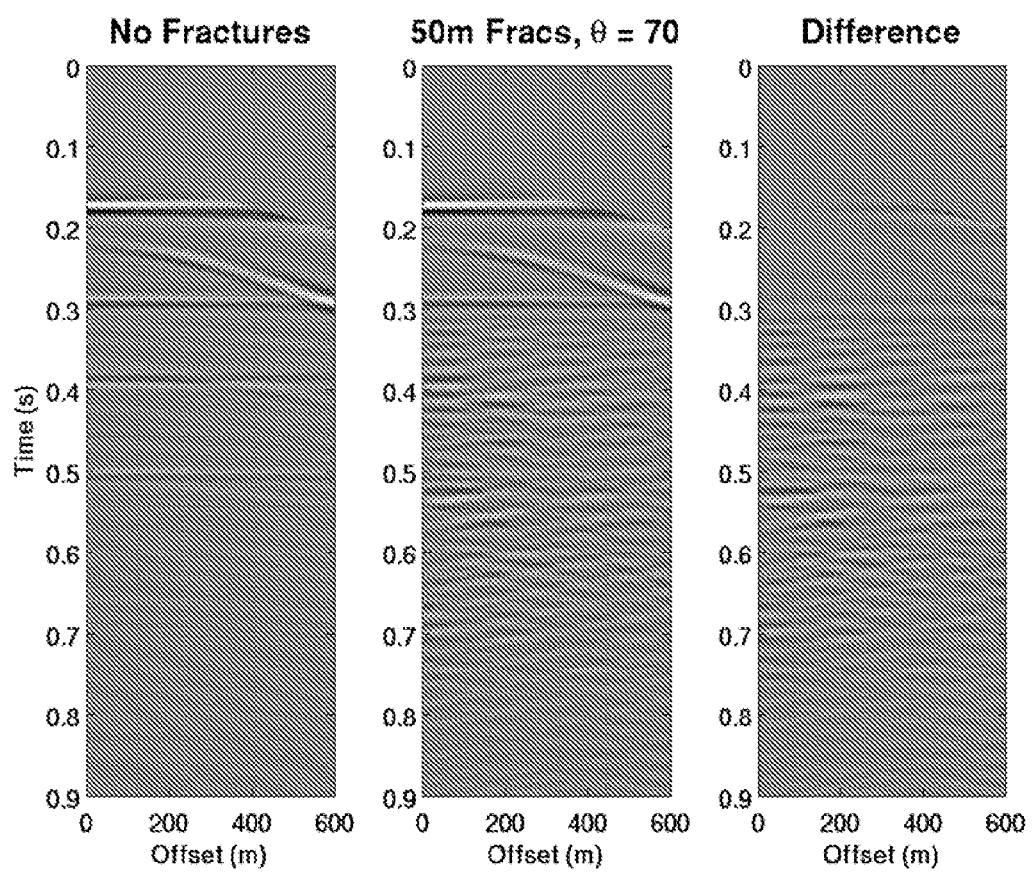
Figure 25:
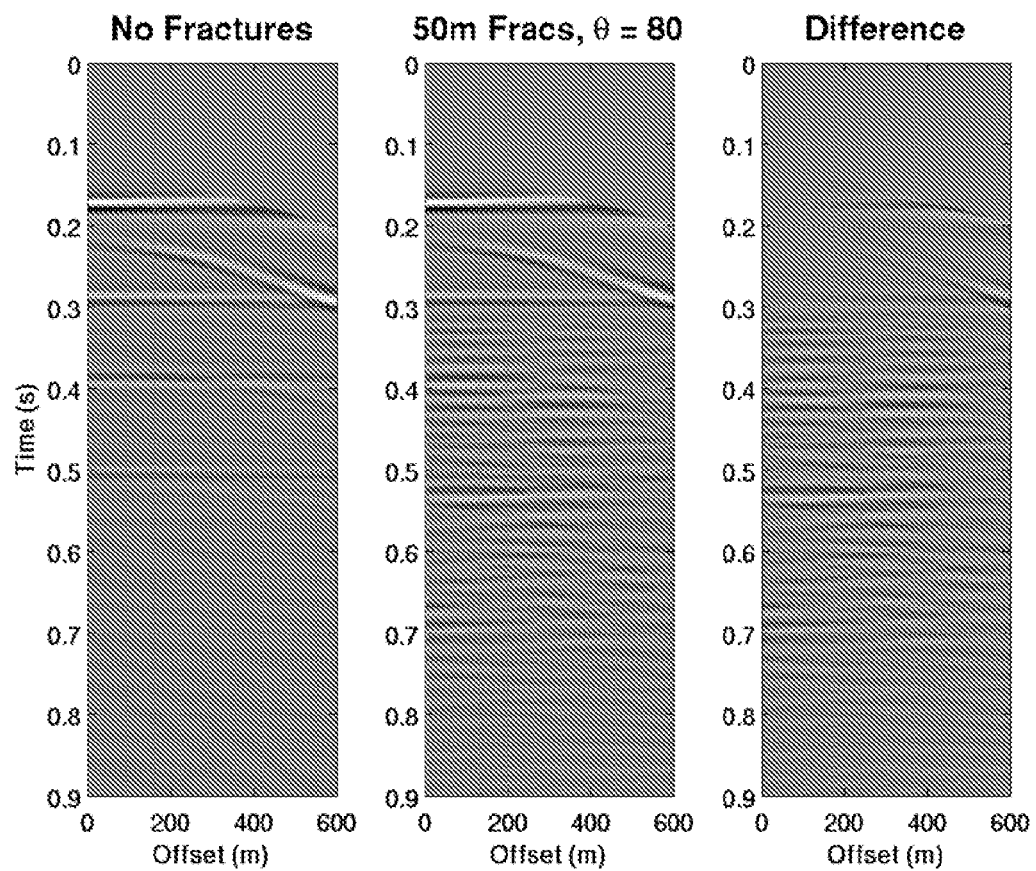
Figure 26:
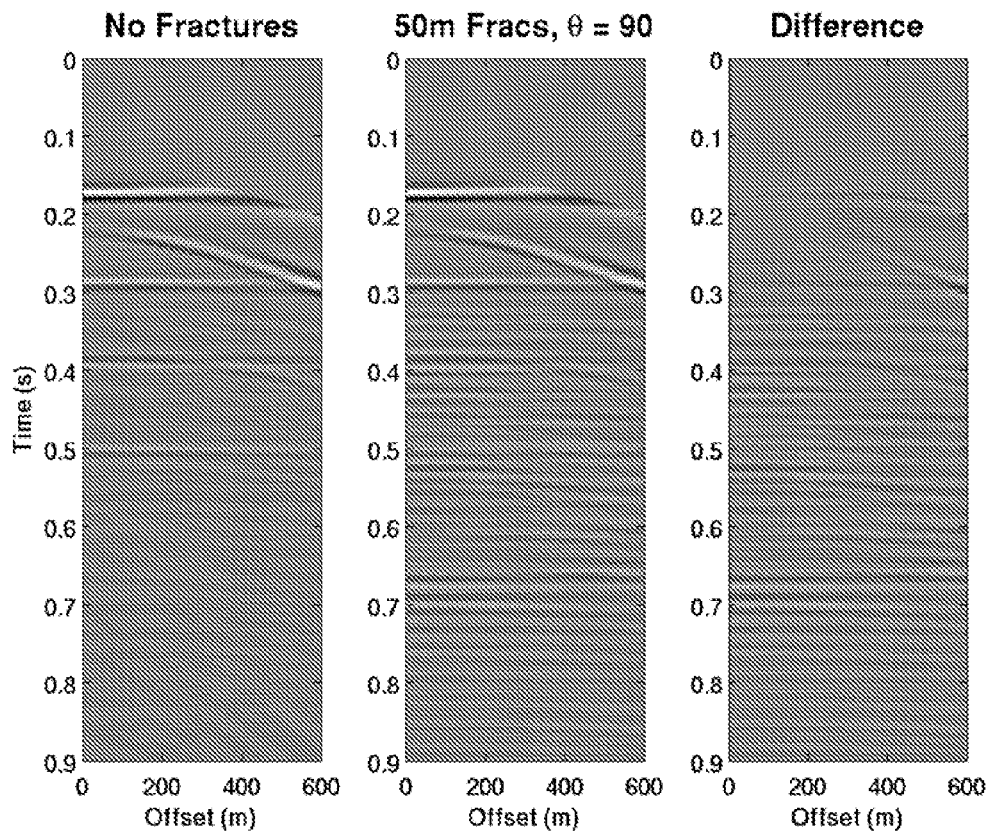
Figure 27:
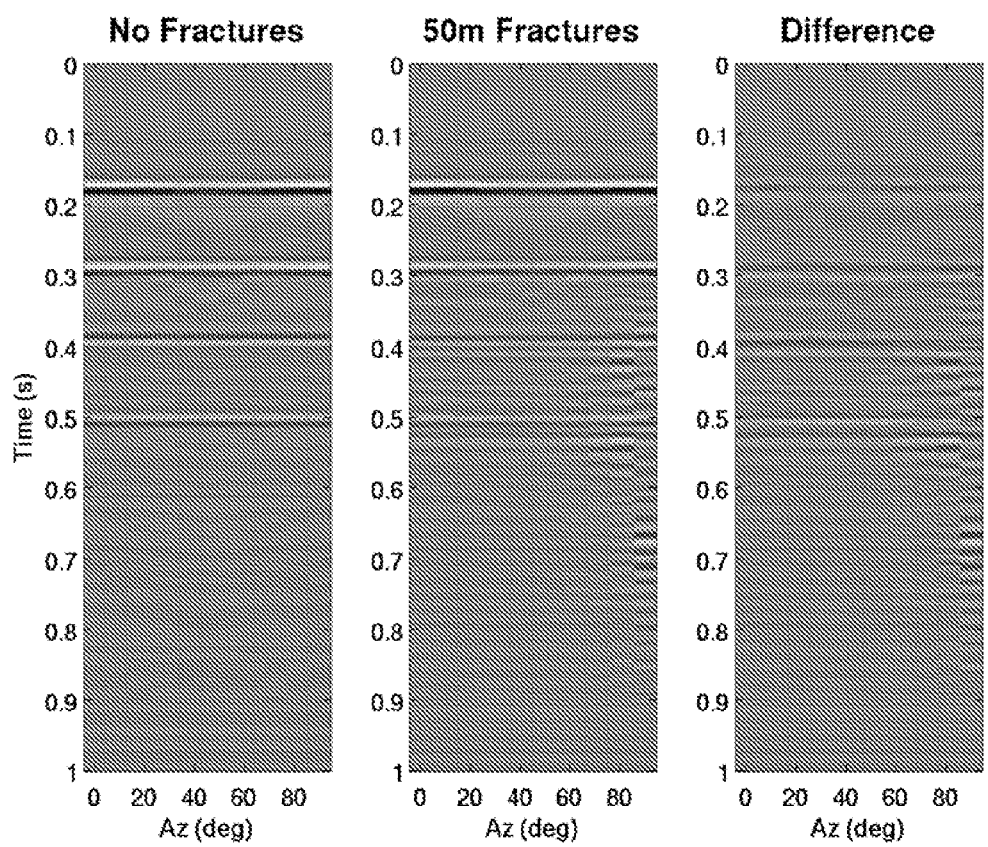
FIG. 27 shows variable density azimuth stacks for 50 m fracture spacing as described in Example 1.
Figure 28:
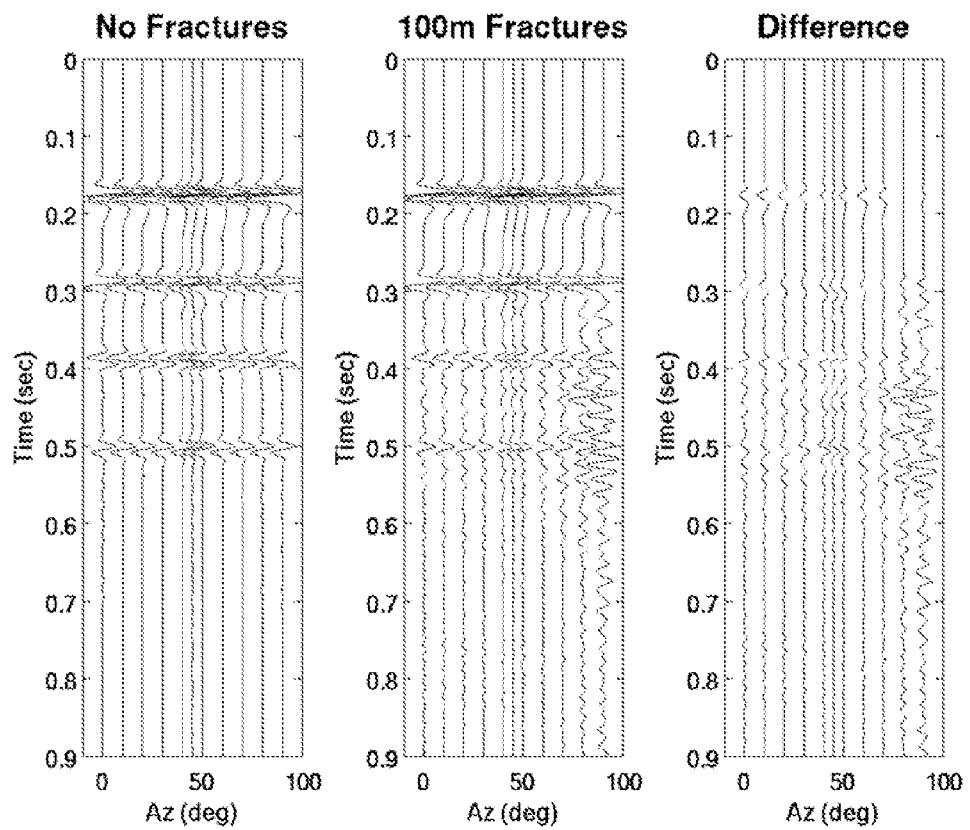
FIG. 28 shows wiggle trace azimuth stacks for 50 m fracture spacing as described in Example 1.
Figure 29:
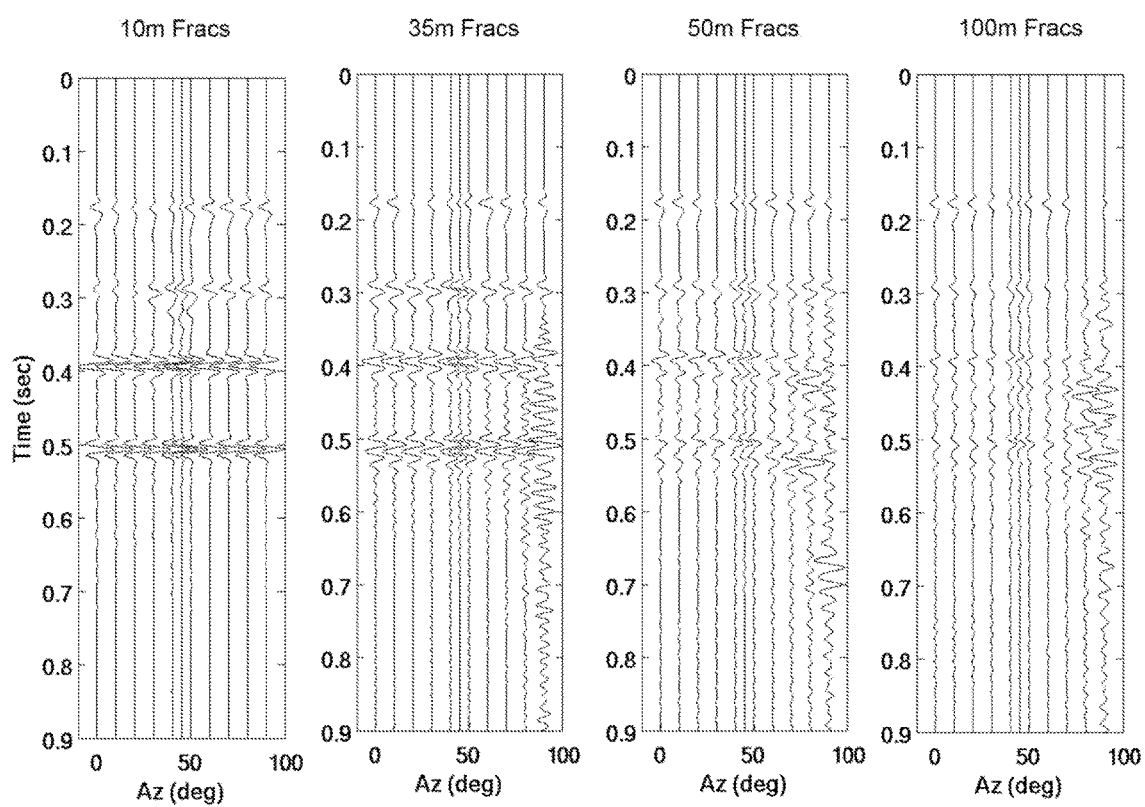
FIG. 29 shows comparison of azimuth stacks for models with different fracture spacing as described in Example 1.
Figure 30:
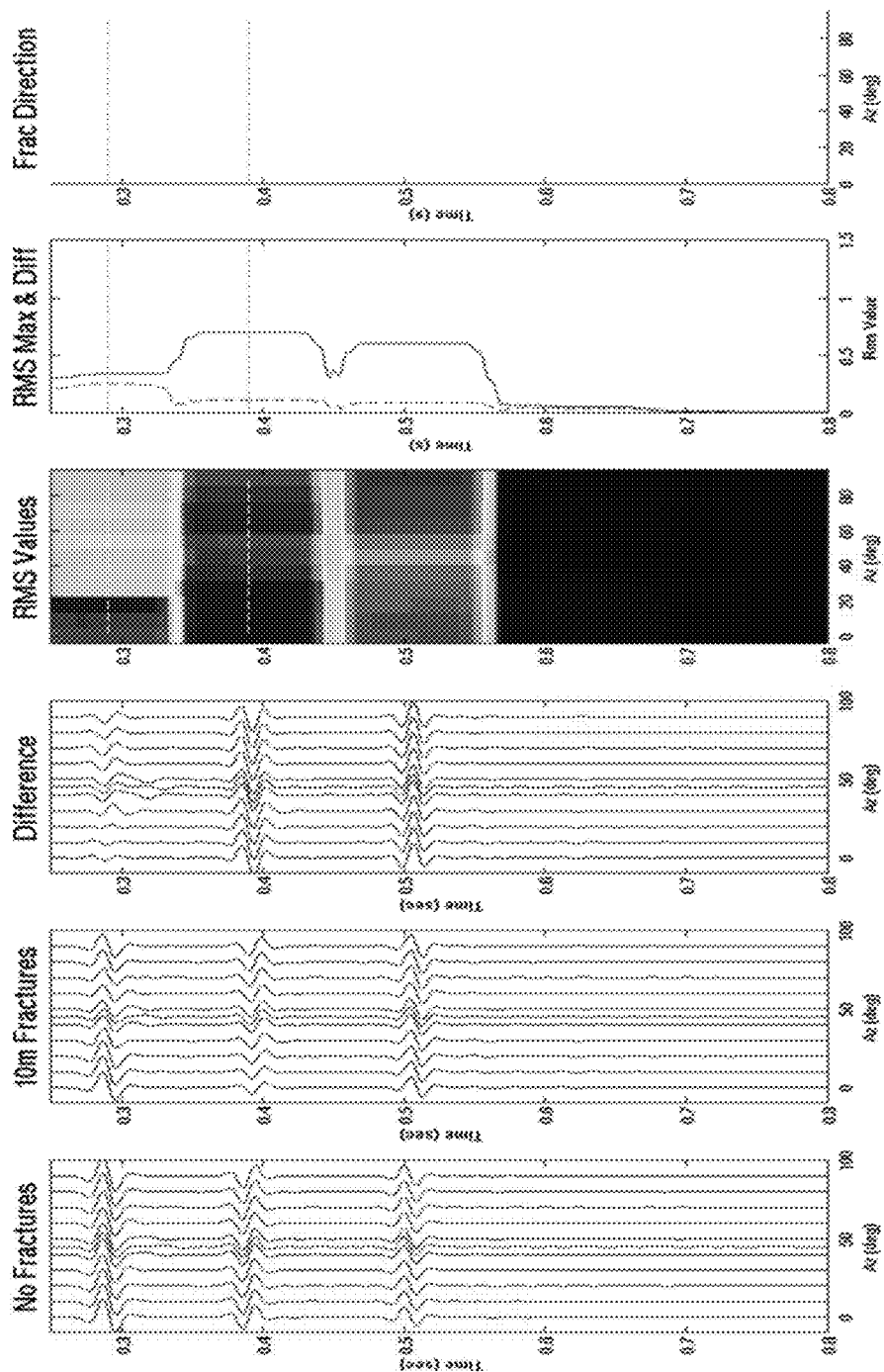
FIGS. 30-34 show fracture detection results for model with varying fracture spacing as described in Example 1.
Figure 31:
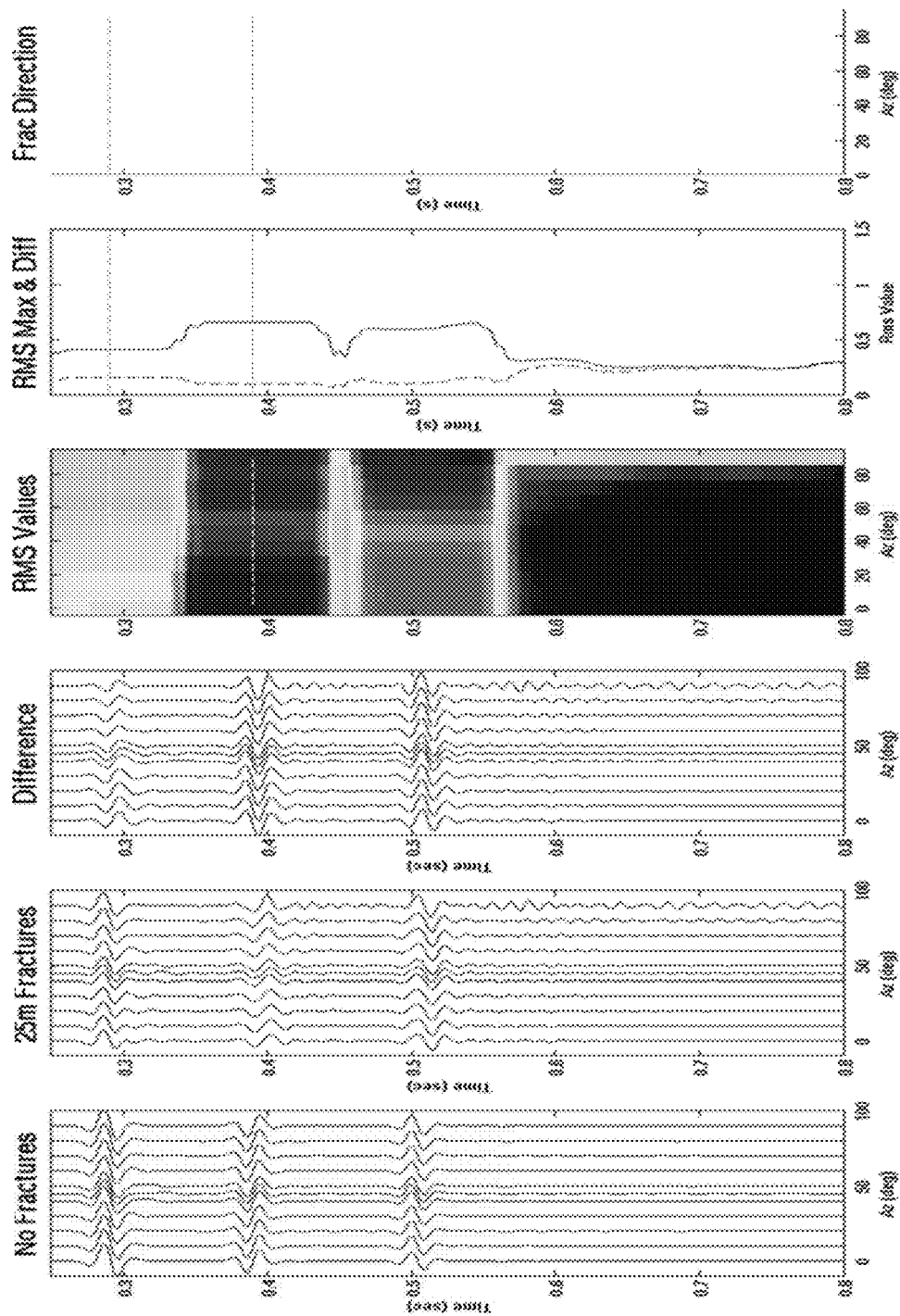
Figure 32:
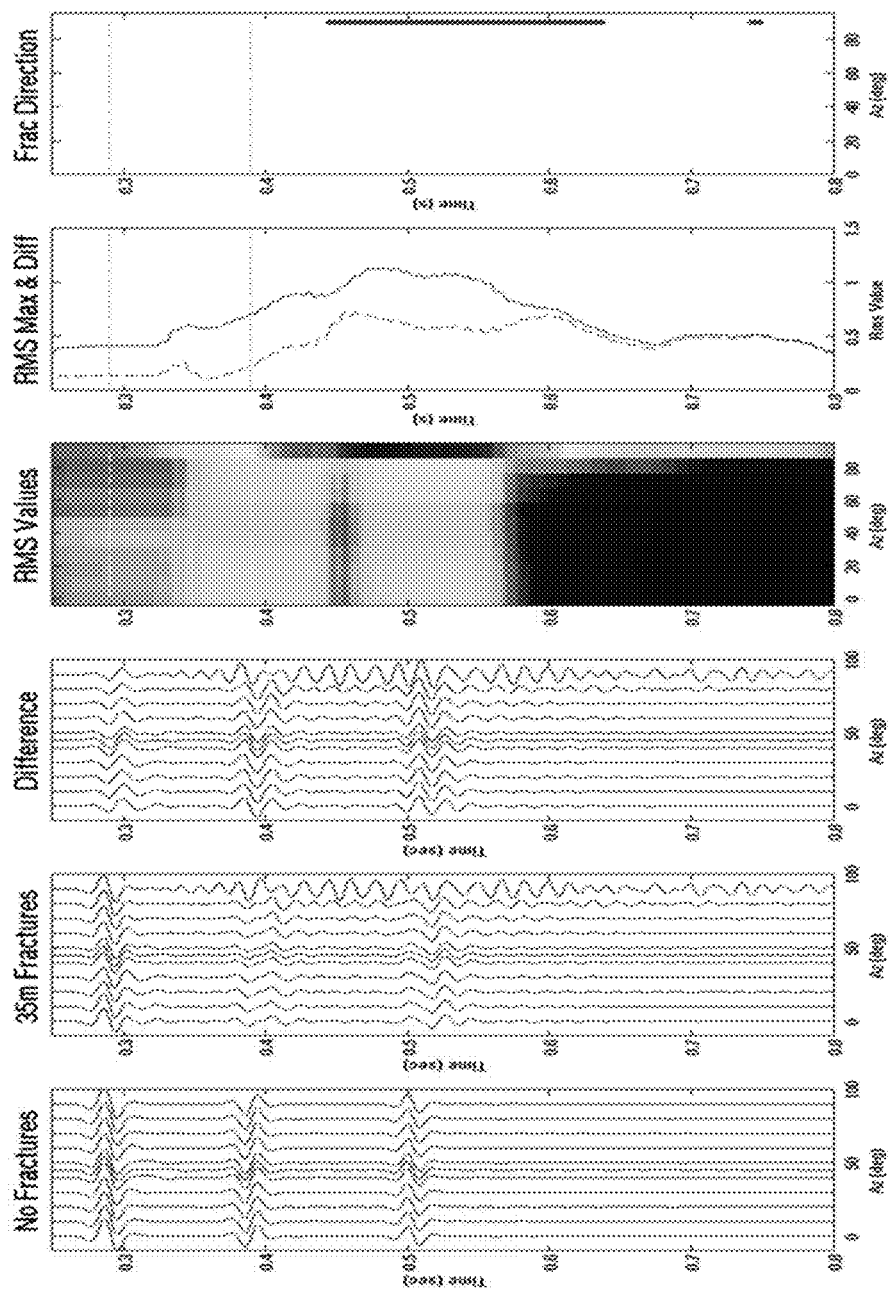
Figure 33:
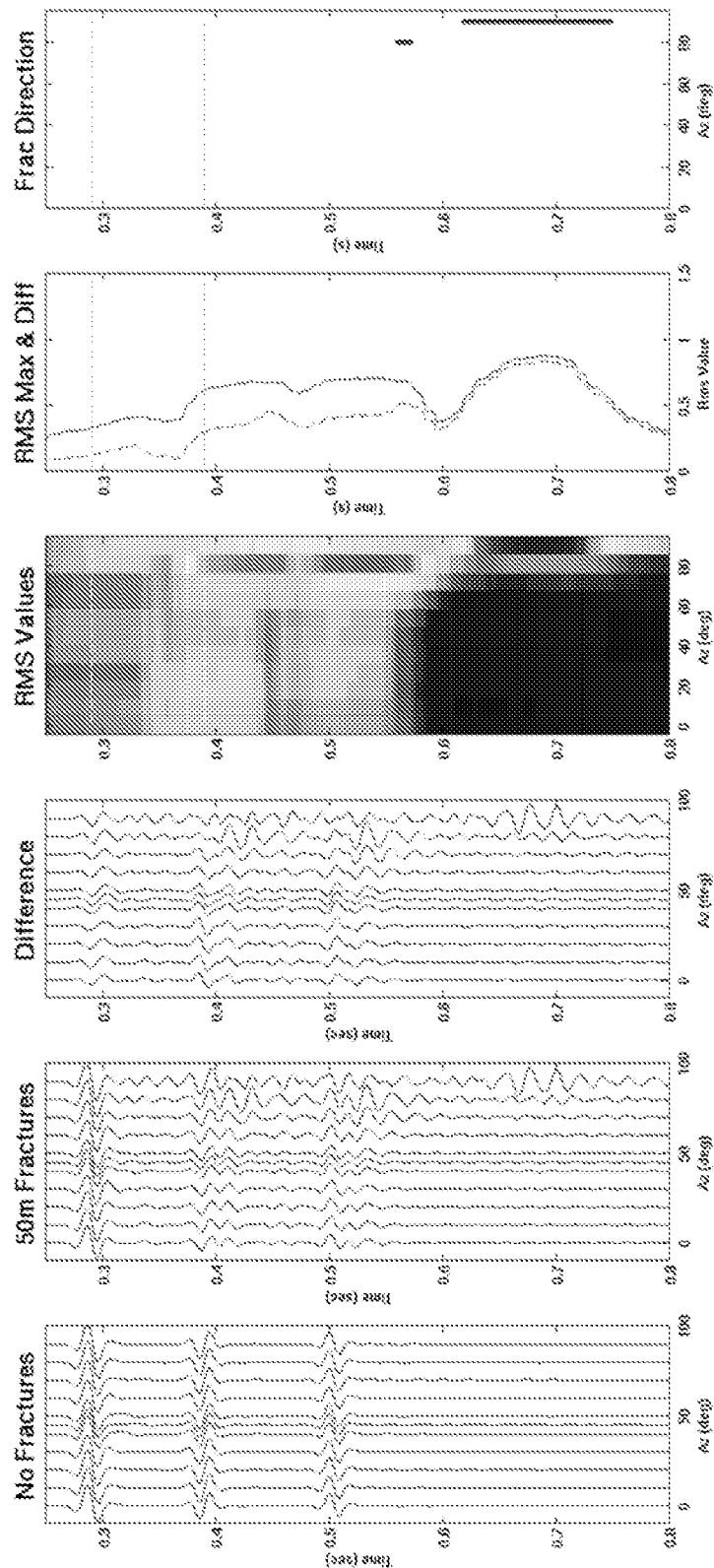
Figure 34:
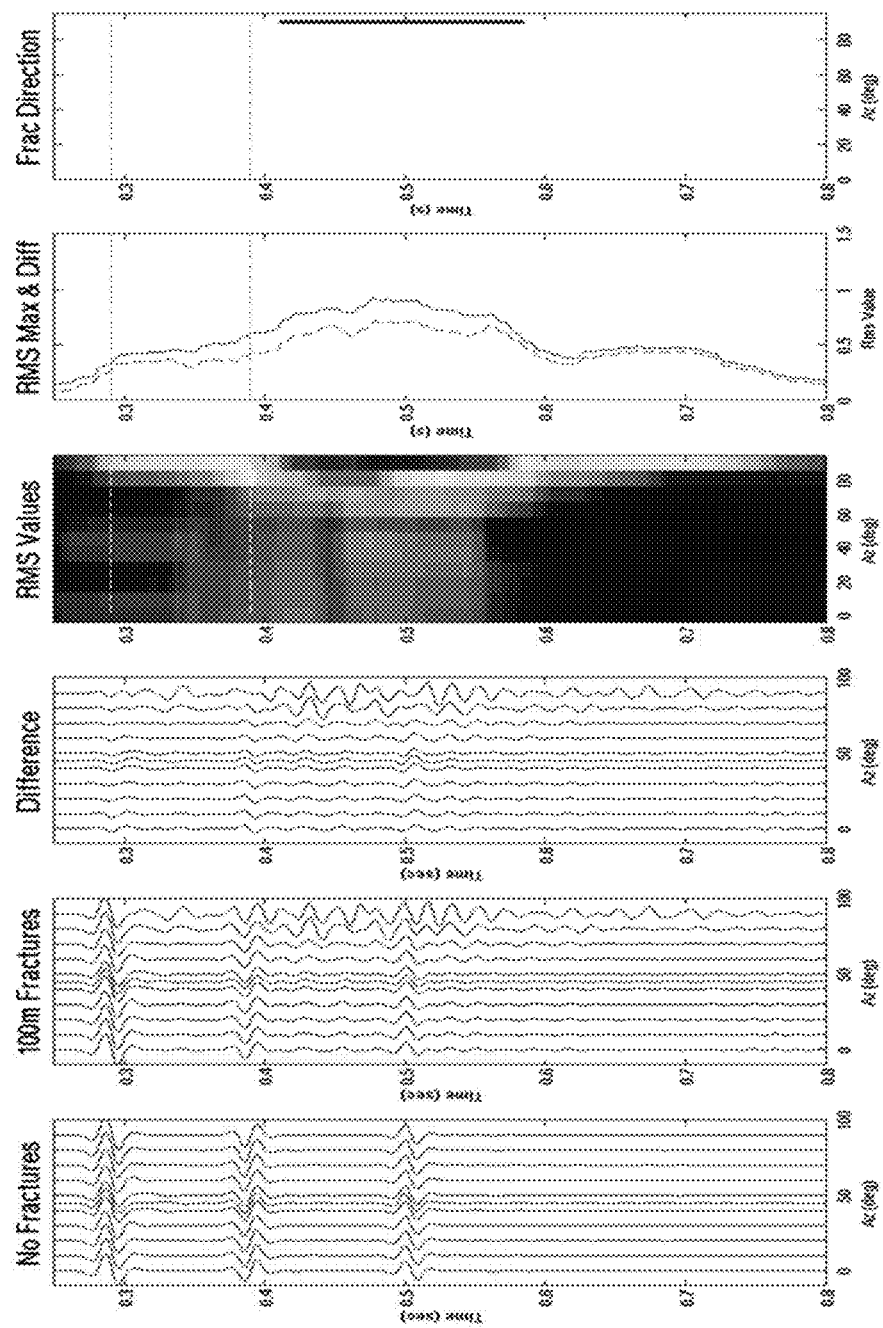
Figure 35:
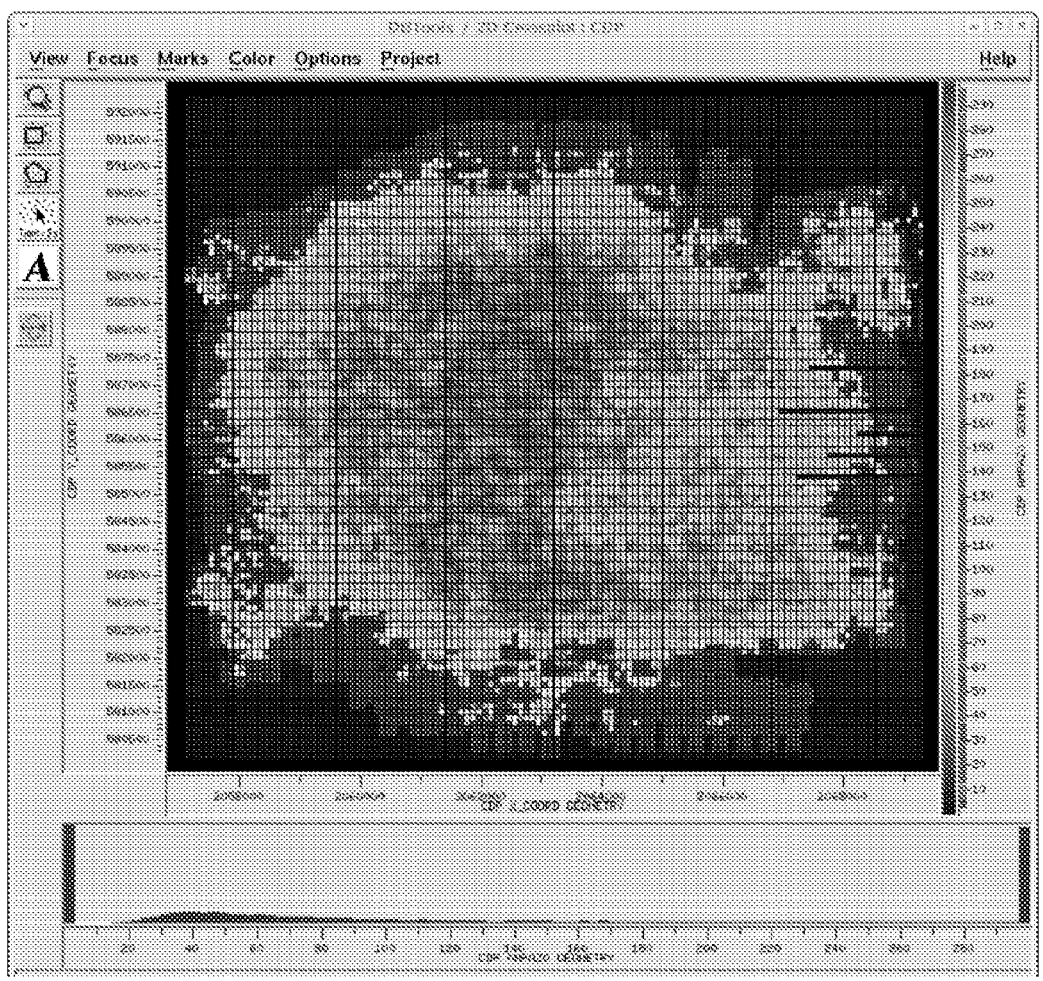
FIGS. 35-42 show maps illustrating RMS amplitudes for all CDPs for a particular azimuth difference stack range, in a time window below a reservoir as described in Example 1.
Figure 36:
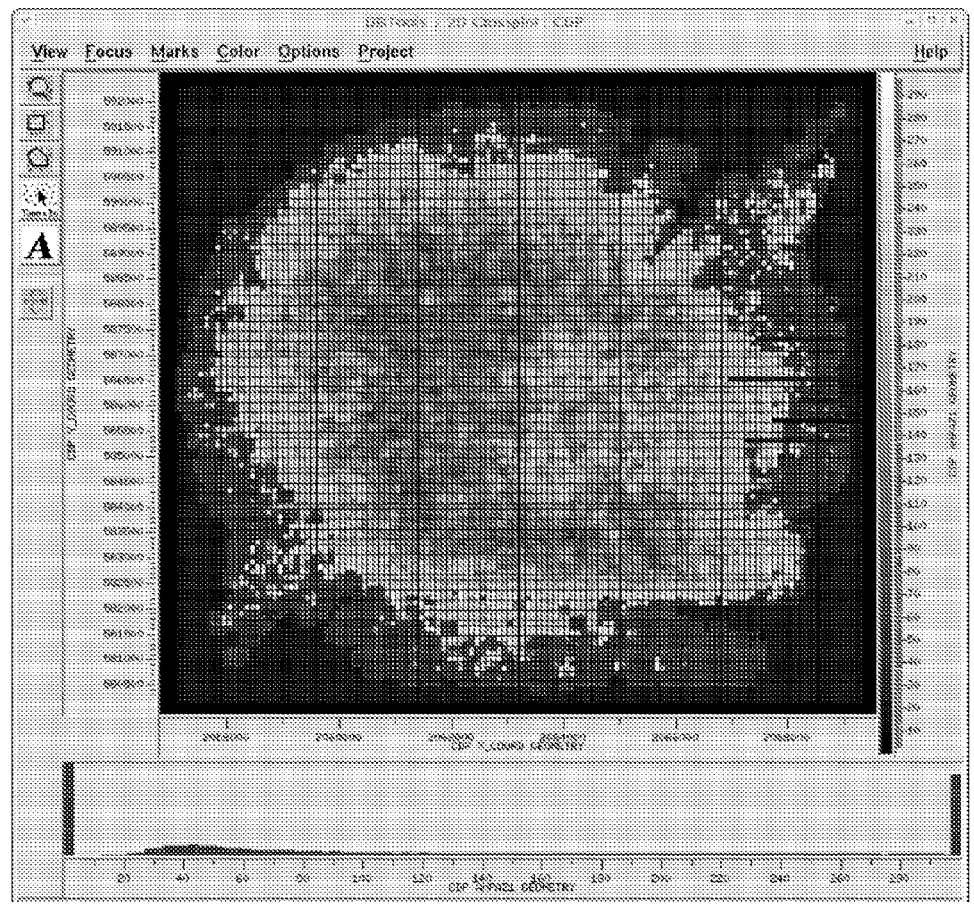
Figure 37:
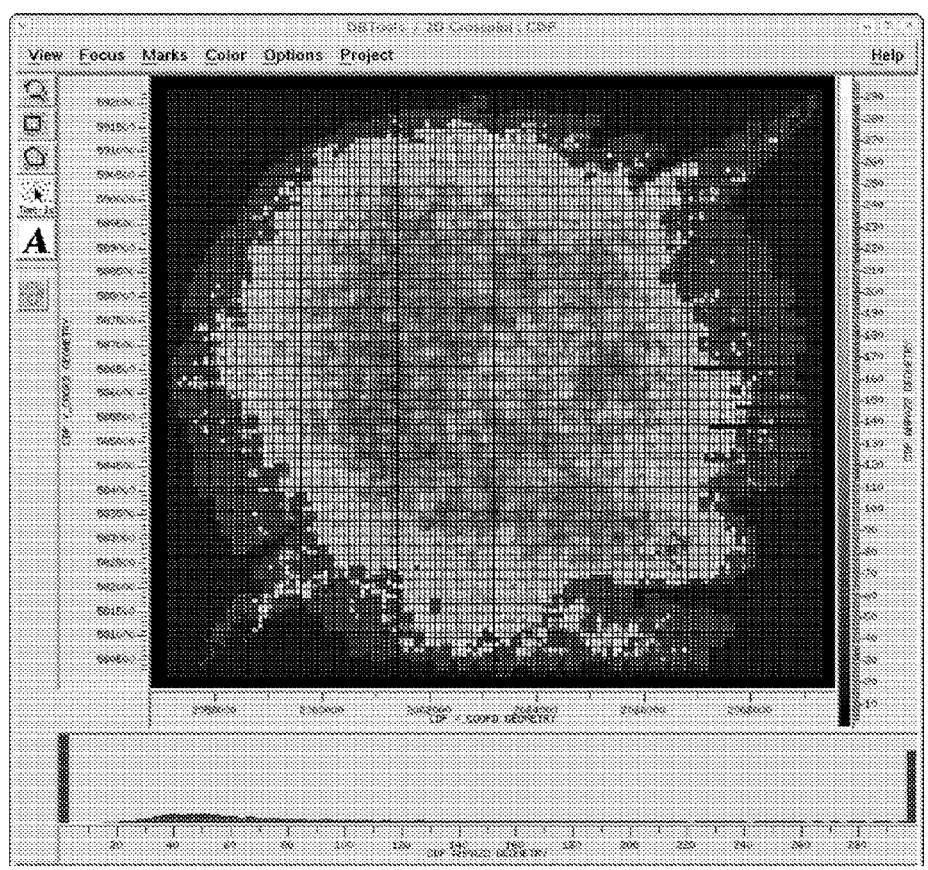
Figure 38:
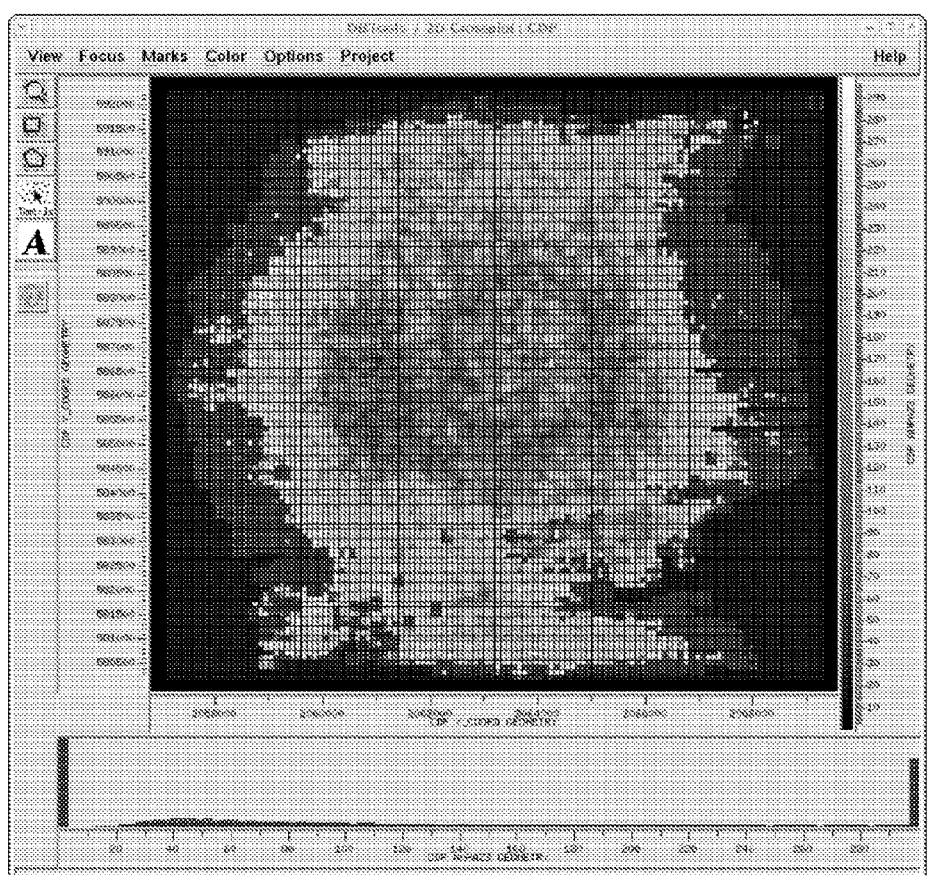
Figure 39:
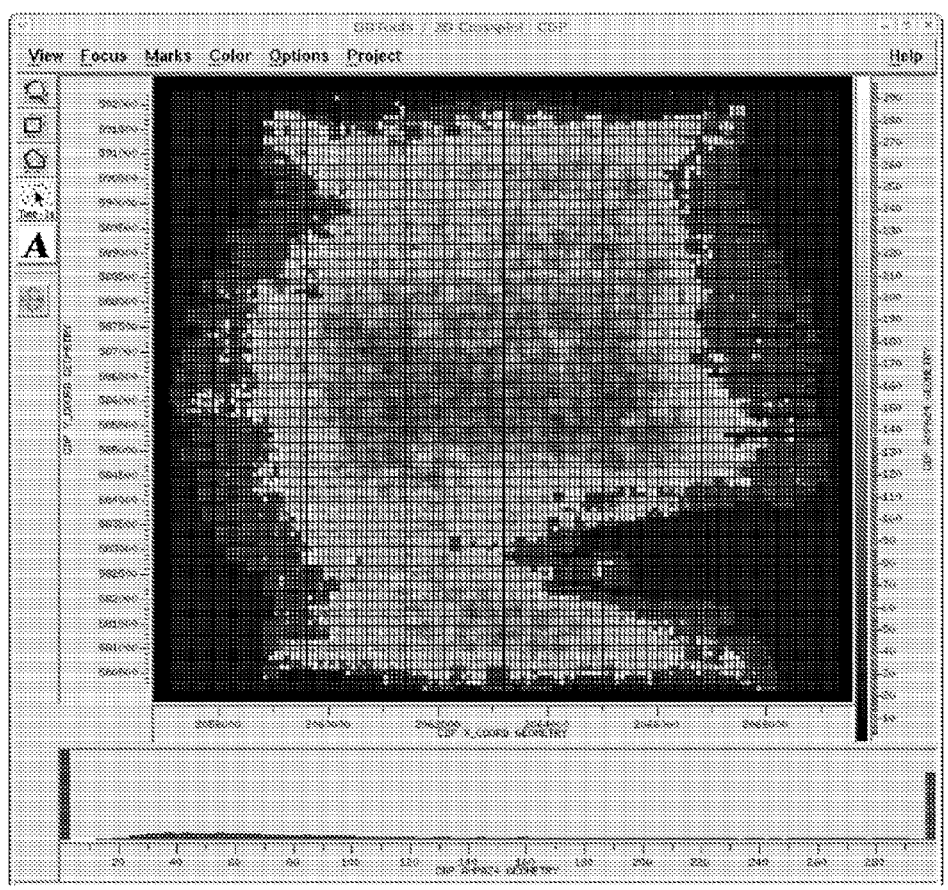
Figure 40:
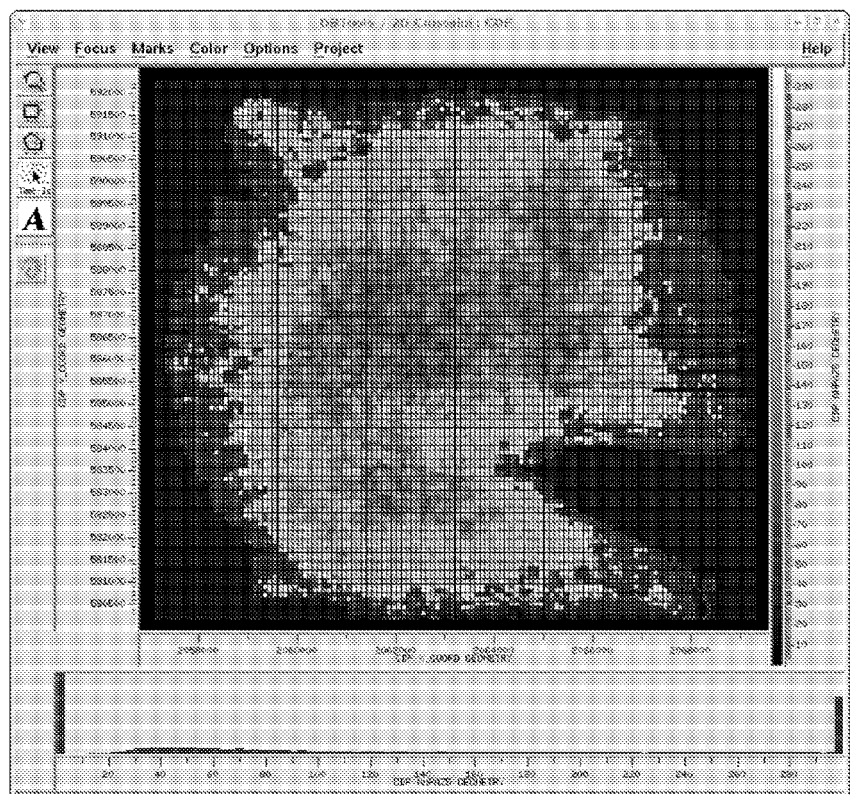
Figure 41:
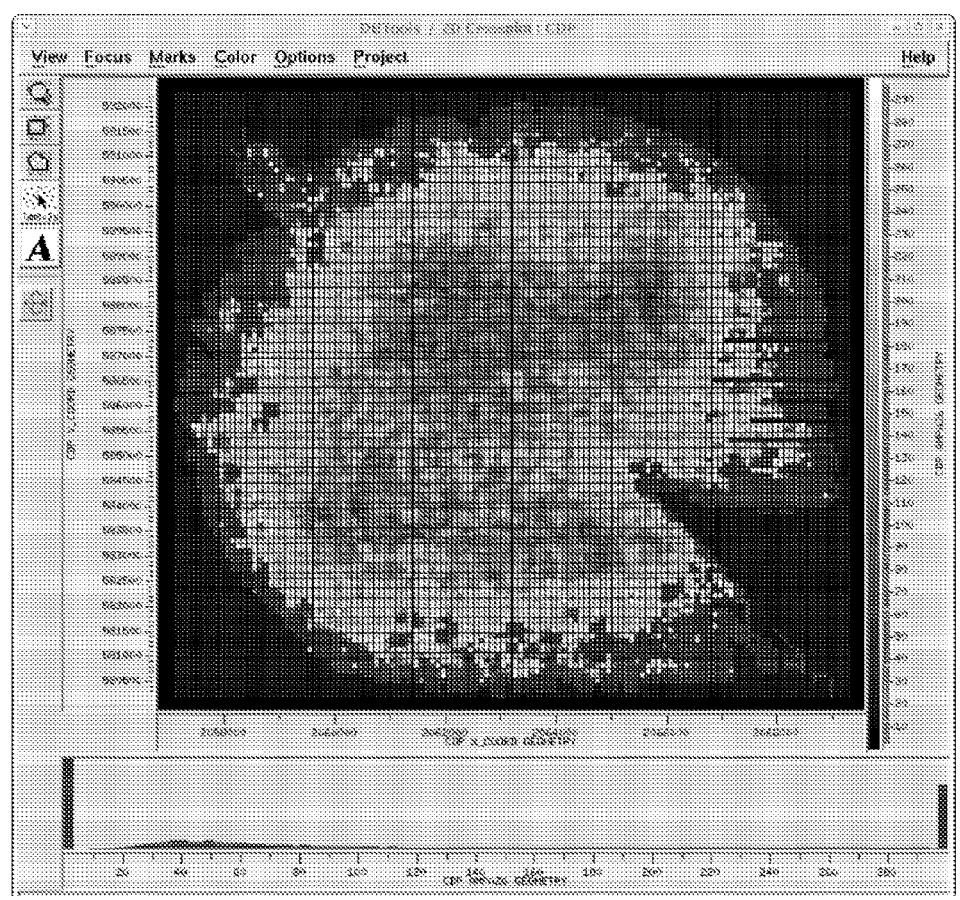
Figure 42:
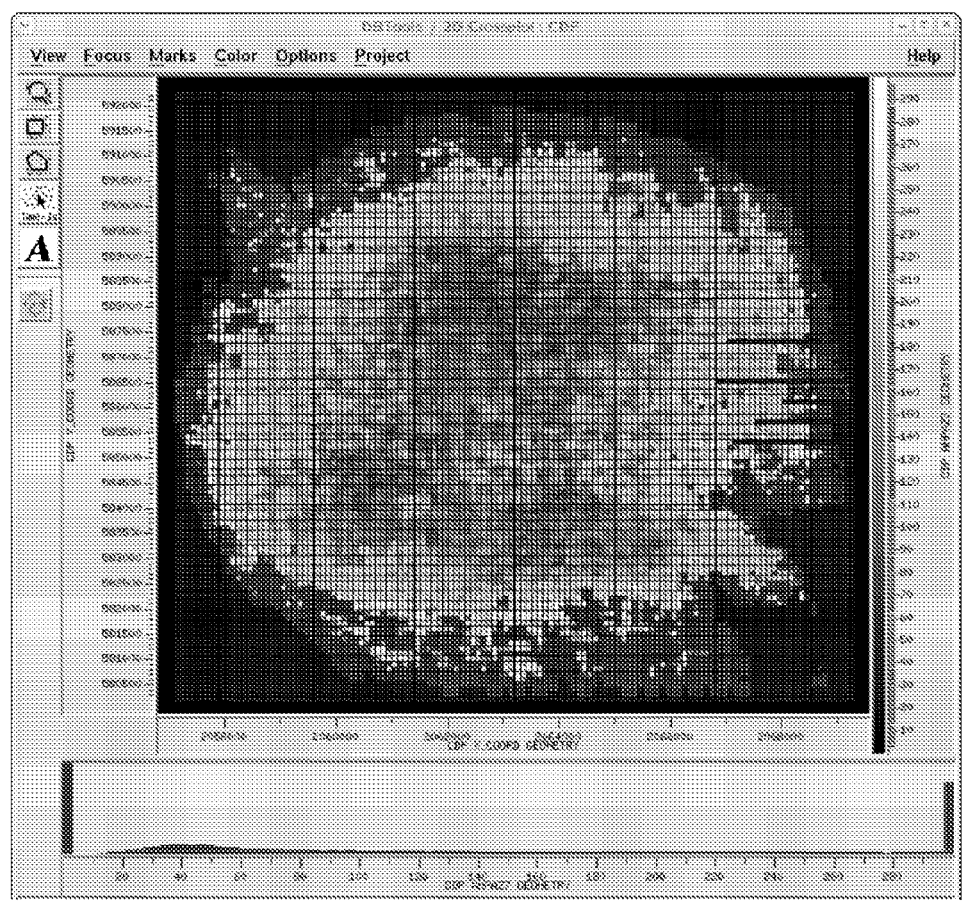

FIGS. 3-13 and 16-26 show shot gathers while FIGS. 14-15 and 27-28 show azimuth stacks for two different fracture spacing (100 m and 50 m). FIGS. 3-13 and 16-26 each show three panels corresponding to a model without fractures (left), fracture spacing (100 m or 50 m) with varying acquisition direction from 0 to 90 degrees (middle), and a difference plot between middle and left panels (right). More particularly in FIG. 3, the difference plot shows that scattered coda energy is not coherent after normal moveout (NMO) and thus does not stack coherently in this azimuth stack direction. FIGS. 14-15 and 27-28 also show three panels corresponding to a model without fractures (left), fracture spacing (100 m or 50 m) with an acquisition direction of 80 degrees (middle), and a difference plot between the middle and left panels (right). FIGS. 14 and 27 show variable density azimuth stacks for each acquisition direction. FIGS. 15 and 28 show wiggle trace azimuth stacks of each acquisition direction. As shown by these figures, more energy is present in the azimuth stacks acquired in the 90 degree direction which corresponds to a direction parallel to the fractures. FIG. 29 shows a comparison of azimuth stacks for models with different fracture spacing (10 m, 35 m, 50 m, and 100 m).

FIGS. 30-34 show fracture detection results for a model with 100 m fracture spacing. First panel (from left) shows azimuth stacks for model with no fractures. Second panel shows azimuth stacks for model with fractures. Third panel shows difference between model with fractures and without fractures. Fourth panel shows RMS energy in a running window down each different trace in the third panel. Fifth panel shows maximum RMS energy for each time sample across all azimuth (solid) and the difference between the maximum and minimum RMS energy for each time sample across all azimuths (dotted). Sixth panel shows fracture detection derived from values of dotted line exceeding 0.5 in the fifth panel.

Figure 43:
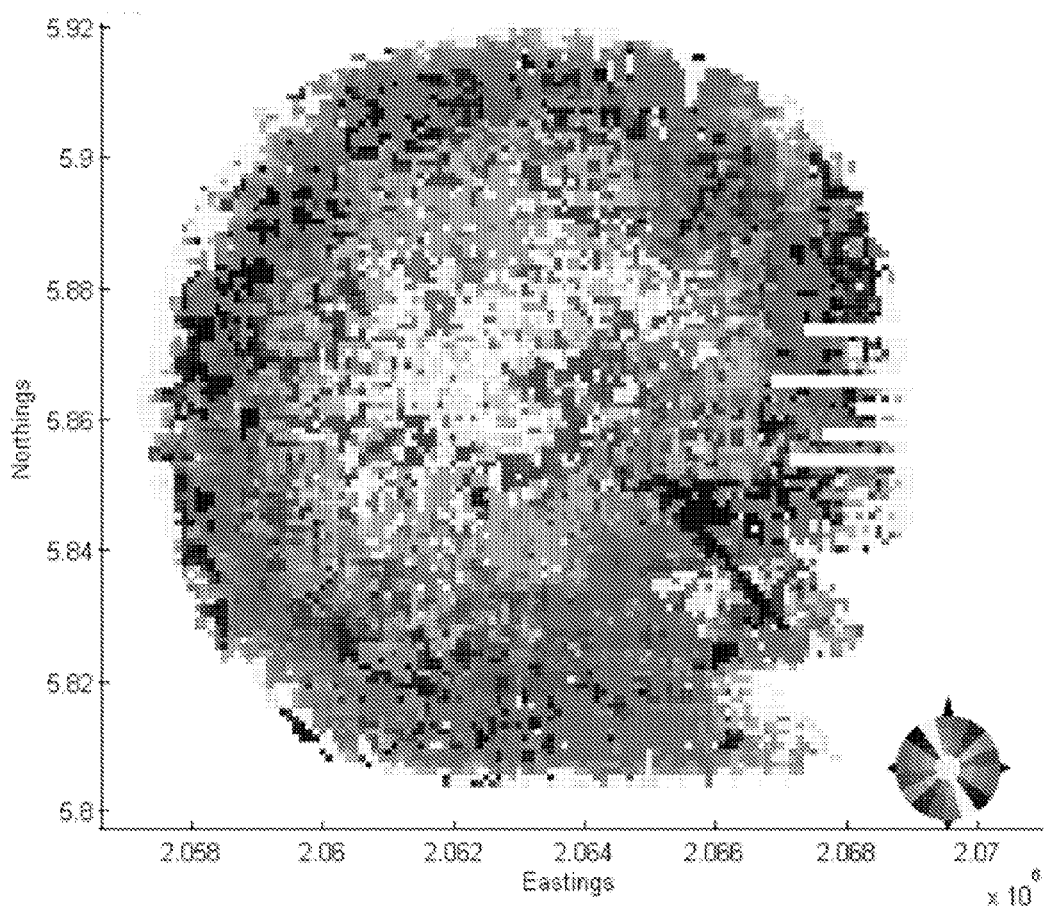
FIG. 43 shows a plot illustrating direction of fracture as described in Example 1.

RMS amplitude changes with azimuth created from the difference traces within a carefully selected time window are shown in FIGS. 35-42. Each figure shown is a map showing the RMS amplitudes for all CDPs for a particular azimuth difference stack range (0-40°, 20-60°, 40-80°, 60-100°, 80-120°, 120-160°, or 140-180°) in a time window below the reservoir. The azimuth of the maximum recorded RMS difference energy for all CDP's are plotted on a map as shown in FIG. 43. Clearly seen in the middle of the plot are preferred fracture orientations of N10CE and N20E. The areas around the edges show an orientation of generally NW which may only indicate low fold (poor signal) areas. The clear preferred fracture orientation detected is in the direction expected from regional stress information and/or other production information.

Generally, it is important to note the relationship between size of the scatterer (a) and the seismic wavelength ($\lambda$). If the size of the fractures and spacing is much smaller than the seismic wavelength (i.e. $a \ll \lambda$), the observation is that of an effective medium with no observable variation of scattered energy with azimuth. In such cases, it is unlikely that any scattered energy is present. However if the size of the fractures and spacing is equivalent to the seismic wavelength ($a \sim \lambda$), the fractures will scatter the seismic energy and the response will depend on the direction of the fracture orientation relative to the seismic acquisition. The scattered energy is detected at a travel time later than the reservoir reflection travel times. FIGS. 30-34 show the difference from induced fractures with increasing fracture spacing. This example demonstrates that the present invention may be used to detect, among other things, azimuthal changes in the time-lapse difference in a time window below the reservoir interval.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A computer-implemented method for characterizing an induced fracture in a subterranean formation comprising:
   obtaining scattered wavefield data corresponding to a first seismic survey and a second seismic survey, the scattered wavefield data detected using at least one sensor;
   obtaining azimuth stacks on the first seismic survey and the second seismic survey;
   creating time-lapse azimuth stacks between corresponding azimuth stacks in the first seismic survey and the second seismic survey;
   creating new traces with root mean square energy in a moving time window on the time-lapse azimuth stacks;
   for each of one or more time samples on the new traces, identifying a lowest root mean square energy and a highest root mean square energy for the time-lapse azimuth stacks;
   determining a threshold for a difference between the highest root mean square energy and the lowest root mean square energy;
   identifying any of the one or more time samples that exceeds the threshold;
   for each of the one or more time samples that exceeds the threshold, recording an azimuth with a largest overall root mean square energy; and
   determining a direction of the induced fracture, wherein the azimuth with the largest overall root mean square energy identifies the direction of the induced fracture.

2. The computer-implemented method of claim 1, wherein the induced fracture is created by hydraulic fracturing.

3. The computer-implemented of claim 1, wherein the first seismic survey is a base survey and the second seismic survey is a monitor survey.

4. The computer-implemented of claim 1, wherein the first seismic survey is taken before a treatment and the second seismic survey is taken after the treatment.

5. The computer-implemented of claim 1, further comprising: sorting the one or more time samples according to the threshold for the difference between the highest root mean square energy and the lowest root mean square energy for each of the one or more time samples.

6. The computer-implemented of claim 5, wherein sorting the one or more time samples includes separating time samples having a root mean square difference larger than the threshold from time samples having a second root mean square difference lower than the threshold.

7. A computer-implemented method for monitoring a hydraulic fracturing treatment of a subterranean formation comprising:
   obtaining an azimuth stack on a base survey of the subterranean formation before the hydraulic fracturing treatment;
   obtaining a second azimuth stack on a monitor survey of the subterranean formation after the hydraulic fracturing treatment, the hydraulic fracturing treatment including an injection of pressurized fluid creating an induced fracture in the subterranean formation;
   creating a time-lapse azimuth stack between the azimuth stack on the base survey and the second azimuth stack on the monitor survey;
   identifying a lowest root mean square energy and a highest root mean square energy for the time-lapse azimuth stack;
   determining a threshold for a difference between the highest root mean square energy and the lowest root mean square energy;
   for each of a plurality of time samples that exceeds the threshold, recording an azimuth with a largest overall root mean square energy;
   determining a direction of the induced fracture, wherein the azimuth with the largest overall root mean square energy identifies the direction of the induced fracture.

8. The computer-implemented of claim 7, further comprising: creating a trace with root mean square energy in a moving time window on the time-lapse azimuth stack prior to identifying the lowest root mean square energy and the highest root mean square energy for the time-lapse azimuth.

9. The computer-implemented of claim 7, further comprising: setting the threshold for the difference.

10. The computer-implemented of claim 7, wherein time samples having a root mean square difference larger than the threshold are separated from time samples having a second root mean square difference lower than the threshold.

11. A computer-implemented method for monitoring a hydraulic fracturing treatment of a subterranean formation comprising:
   obtaining a base survey of the subterranean formation, the base survey generated based on returning seismic energy from one or more seismic signals and detected by at least one sensor, the one or more seismic signals generated by an acoustic energy source;
   obtaining an azimuth stack on the base survey of the subterranean formation before the hydraulic fracturing treatment;
   obtaining a second azimuth stack on a monitor survey of the subterranean formation after the hydraulic fracturing treatment;
   creating a time-lapse azimuth stack between the azimuth stack on the base survey and the second azimuth stack on the monitor survey;
   identifying a lowest root mean square energy and a highest root mean square energy for the time-lapse azimuth stack;
   determining threshold for a difference between the highest root mean square energy and lowest root mean square energy;

for each of a plurality of time samples that exceeds the threshold, recording an azimuth with a largest overall root mean square energy; and determining a direction of an induced fracture, wherein the azimuth with the largest overall root mean square energy identifies the direction of the induced fracture.

12. The computer-implemented of claim 11, further comprising: creating a trace with root mean square energy in a moving time window on the time-lapse azimuth stack prior to identifying the lowest root mean square energy and the highest root mean square energy for the time-lapse azimuth.

13. The computer-implemented of claim 11, further comprising: setting the threshold for the difference.

14. The computer-implemented of claim 13, wherein time samples having a root mean square difference larger than the threshold are separated from time samples having a root mean square difference lower than the threshold.

* * * * *